(12) United States Patent
Hsieh et al.

(10) Patent No.: US 10,503,606 B2
(45) Date of Patent: Dec. 10, 2019

(54) DATA BACKUP METHOD, DATA RECOVERY METHOD AND STORAGE CONTROLLER

(71) Applicant: SHENZHEN EPOSTAR ELECTRONICS LIMITED CO., Shenzhen OT (CN)

(72) Inventors: Hung-Chih Hsieh, Hsinchu County (TW); Yu-Hua Hsiao, Hsinchu County (TW); Hsiu-Hsien Chu, Hsinchu (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 159 days.

(21) Appl. No.: 15/726,353

(22) Filed: Oct. 5, 2017

(65) Prior Publication Data

US 2019/0034287 A1    Jan. 31, 2019

(30) Foreign Application Priority Data

Jul. 26, 2017   (TW) .............................. 106125044 A

(51) Int. Cl.
*G06F 11/14* (2006.01)
*G06F 3/06* (2006.01)
*G06F 12/02* (2006.01)

(52) U.S. Cl.
CPC .......... *G06F 11/1451* (2013.01); *G06F 3/065* (2013.01); *G06F 3/0619* (2013.01); *G06F 3/0679* (2013.01); *G06F 12/0246* (2013.01); *G06F 2201/84* (2013.01); *G06F 2212/7201* (2013.01)

(58) Field of Classification Search
CPC .... G06F 11/1451; G06F 3/0679; G06F 3/065; G06F 12/0246; G06F 3/0619; G06F 2212/7201; G06F 2201/84
See application file for complete search history.

(56) References Cited

U.S. PATENT DOCUMENTS

2013/0132650 A1\*   5/2013   Choi ....................... G06F 12/02
                                                                  711/103
2013/0219106 A1\*   8/2013   Vogan ................. G06F 12/0246
                                                                  711/103

\* cited by examiner

*Primary Examiner* — David Yi
*Assistant Examiner* — Alan Otto
(74) *Attorney, Agent, or Firm* — JCIPRNET

(57) ABSTRACT

A data backup method, a data recovery method and a storage controller for a rewritable non-volatile memory module are provided. The data backup method includes receiving a trim command; generating a trim information list according to the trim command and a physical address that stores the trim information list, wherein the trim information list records information corresponding to the trim command and the physical address; storing the generated trim information list into the physical address. The data recovery method includes re-establishing a logical-to-physical table; loading a latest trim information list into a memory from the rewritable non-volatile memory module; updating the re-established logical-to-physical table or the trim information list in the memory according to the trim information.

18 Claims, 16 Drawing Sheets

DATA BACKUP METHOD, DATA RECOVERY METHOD AND STORAGE CONTROLLER

CROSS-REFERENCE TO RELATED APPLICATION

This application claims the priority benefit of Taiwan application serial no. 106125044, filed on Jul. 26, 2017. The entirety of the above-mentioned patent application is hereby incorporated by reference herein and made a part of this specification.

BACKGROUND OF THE INVENTION

Field of the Invention

The invention is related to a data backup method and a data recovery method, and particularly to a data backup method, a data recovery method and a storage controller adapted to a storage device equipped with a rewritable non-volatile memory module.

Description of Related Art

Generally speaking, a host system can utilize a trim command to notify a storage device (e.g., a solid state disk (SSD)) equipped with a rewritable non-volatile memory module that in which physical unit (physical block) the data is no longer regarded as being in use (i.e., invalid data) and that the plurality of physical units can be erased. A controller of the storage device marks a physical unit address corresponding to a logical unit address indicated by the trim command as invalid according to the trim information of the trim command, such that the controller can identify that the data stored in the physical unit address is invalid data via the physical unit marked as invalid in the subsequent operations, thereby improving management efficiency of the storage device. For example, with the invalid data marked by the trim command, the efficiency of garbage collecting operation can be improved.

However, it is an issue worth exploring as to how to instantly manage (retain) the trim information of the received trim command so as to handle sudden-power-off situation and perform data recovery operation afterwards. More specifically, generally the controller maintains a logical-to-physical table (L2P table) to monitor the whole mapping state of logic unit and physical unit. However, the shortcoming of the logical-to-physical table (hereafter L2P table) is that it is required for the controller to update and store the LP2 table maintained in a memory (e.g., RAM) into the storage device at a specific timing. Otherwise the L2P table will disappear in the next booting operation. In addition, in order to support the trim command, the L2P table also includes the mapping relationship between the logical unit address and the physical unit address that store the trim information corresponding to the trim command. In order to safely recover the L2P table and the latest trim information in every booting operation or recovery operation after power-off situation, the conventional approach is that the L2P table and the latest trim command are stored (programmed) in the storage device after receiving every trim command. However, the conventional approach reduces system performance and decreases the service life of the physical unit.

Accordingly, it has become an issue for persons skilled in the art to explore how to manage the trim information and the L2P table more efficiently so as to perform the data recovery operation in a better way as well as improve the performance and security of the storage device equipped with the rewritable non-volatile memory module.

SUMMARY OF THE INVENTION

The invention provides a data backup and recovery method and a storage controller, which can utilize a trim information with a specific data structure and a L2P table that are backed up into a rewritable non-volatile memory module to perform corresponding data recovery operation.

An embodiment of the invention provides a data backup method which is adapted to a storage device equipped with a rewritable non-volatile memory module, wherein the rewritable non-volatile memory module has a plurality of physical units, and the rewritable non-volatile memory module is allocated with a plurality of physical addresses, wherein a host system coupled to the storage device is allocated with a plurality of logical addresses. The method includes receiving a trim command from the host system, wherein the trim command indicates an invalid data stored in a logical address section; generating a trim information according to the trim command and a target physical address among the plurality of physical addresses so as to update a first trim information list as a second trim information list according to the trim information, wherein the trim information records an invalid data starting logical address, an invalid data length, an trim information page order and a trim information timestamp; storing the second trim information list to the target physical address, wherein the first or the second trim information list records one or more trim information in sequence according to a time sequence of receiving the trim command corresponding to the one or more trim information; recording the target physical address for storing the second trim information list into a trim information list physical address of the first logical-to-physical table so as to update the first logical-to-physical table as a second logical-to-physical table; and when a predetermined condition is fulfilled, storing the second logical-to-physical table into the rewritable non-volatile memory module.

An embodiment of the invention provides a data recovery method adapted to a storage device equipped with a rewritable non-volatile memory module, wherein the rewritable non-volatile memory module has a plurality of physical units, and the rewritable non-volatile memory module is allocated with a plurality of physical addresses, wherein a host system coupled to the storage device is allocated with a plurality of logical addresses. The method includes re-establishing a first logical-to-physical table according to a first logical-to-physical table stored in the rewritable non-volatile memory module, a physical address of all valid data of which a timestamp is larger than a timestamp of the first logical-to-physical table in the rewritable non-volatile memory module, and a corresponding logical address, and storing the re-established first logical-to-physical table into a memory as a second logical-to-physical table; if the rewritable non-volatile memory module stores one or more first trim information lists, identifying the latest second trim information list among the one or more first trim information lists, wherein each of the first trim information list of the one or more first trim information lists records one or more trim information, wherein each of the trim information records an invalid data starting logical address, an invalid data length, a trim information page order and a trim information timestamp, wherein a timestamp of the one or more first trim information lists is larger than a timestamp of the first logical-to-physical table; and updating the second logical-to-physical table or updating a third trim information list stored in the memory according to all of the trim information in the second trim information list and the second logical-to-physical table.

An embodiment of the invention provides a storage controller that controls a storage device equipped with a rewritable non-volatile memory module. The storage controller includes a connection interface circuit, a memory interface control circuit and a processor. The connection interface circuit is coupled to a host system allocated with a plurality of logical addresses. The memory interface control circuit is coupled to the rewritable non-volatile memory module, wherein the rewritable non-volatile memory module has a plurality of physical units, and the rewritable non-volatile memory module is allocated with a plurality of physical addresses. The processor is coupled to the connection interface circuit and the memory interface control circuit. In addition, the processor receives a trim command from the host system, wherein the trim command indicates an invalid data stored in a logical address section, wherein the processor further generates a trim information according to the trim command, a target physical address among the plurality of physical addresses so as to update the first trim information list as the second trim information list according to the trim information, wherein the trim information records an invalid data starting logical address, an invalid data length, a trim information page order and a trim information timestamp. The processor further stores the second trim information list into the target physical address, wherein the first or the second trim information list records one or more trim information in sequence according to a time sequence of receiving the trim command corresponding to the one or more trim information, wherein the processor further records the target physical address for storing the second trim information list into a trim information list physical address of the first logical-to-physical table so as to update the first logical-to-physical table as the second logical-to-physical table. When a predetermined condition is fulfilled, the processor further stores the second logical-to-physical table to the rewritable non-volatile memory module.

An embodiment of the invention provides a storage controller that controls a storage device equipped with a rewritable non-volatile memory module. The storage controller includes a connection interface circuit, a memory interface control circuit and a processor. The connection interface circuit is coupled to a host system allocated with a plurality of logical addresses. The memory interface control circuit is coupled to the rewritable non-volatile memory module, wherein the rewritable non-volatile memory module has a plurality of physical units, and the rewritable non-volatile memory module is allocated with a plurality of physical addresses. The processor is coupled to the connection interface circuit and the memory interface control circuit, wherein the processor re-establishes a first logical-to-physical table according to a first logical-to-physical table stored in the rewritable non-volatile memory module, a physical address of all valid data of which a timestamp is larger than a timestamp of the first logical-to-physical table in the rewritable non-volatile memory module, and a corresponding logical address, and stores the re-established first logical-to-physical table into the memory as the second logical-to-physical table. If the rewritable non-volatile memory module stores one or more first trim information lists, the processor further identifies the latest second trim information list among the one or more first trim information lists, wherein each of the first trim information list of the one or more first trim information lists record one or more trim information, wherein each of the trim information records an invalid data starting logical address, an invalid data length, a trim information page order and a trim information timestamp, wherein a timestamp of the one or more first trim information lists is larger than a timestamp of the first logical-to-physical table. In addition, the processor further updates the second logical-to-physical table or updates the third trim information list stored in the memory according to all of the trim information in the second trim information list and the second logical-to-physical table.

In summary, the data backup method, data recovery method and storage controller provided in the embodiments of the invention can generate a trim information (list) having specific data structure according to the received trim command, and utilize the trim information list and the logical-to-physical table backed up to the rewritable non-volatile memory module to perform corresponding data recovery operation. Since it is not required to back up corresponding trim information and logical-to-physical table to the rewritable non-volatile memory module due to the received trim command, a large amount of writing operation can be avoided, thereby improving the overall operation efficiency of the storage device. In addition, after the (sudden) power-off situation, data recovery can be performed effectively via the backed up trim information list having a specific structure and the logical-to-physical table, such that the trim information list and the logical-to-physical table before the power-off situation can be re-established.

In order to make the aforementioned features and advantages of the invention more comprehensible, embodiments accompanying figures are described in detail below.

DESCRIPTION OF EMBODIMENTS

In the embodiment, a storage device includes a rewritable non-volatile memory module and a storage device controller (also referred to as storage controller or a storage control circuit). In addition, the storage device is used together with a host system such that the host system can write data into the storage device or read data from the storage device.

Figure 1:
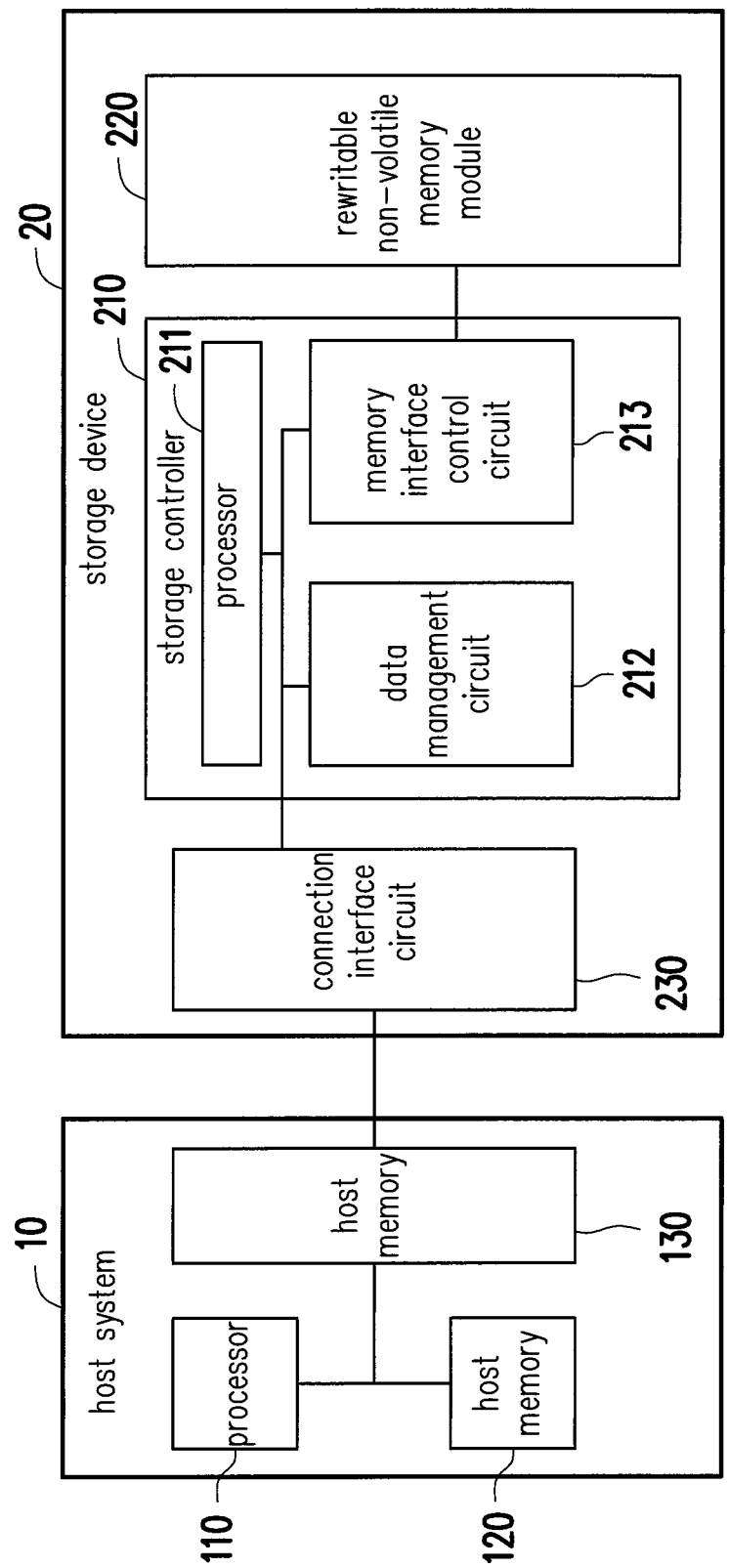
FIG. 1 is a block schematic diagram of a host system and a storage device according to an embodiment of the invention.

FIG. 1 is a block schematic diagram of a host system and a storage device according to an embodiment of the invention.

Referring to FIG. 1, a host system 10 includes a processor 110, a host memory 120 and a data transfer interface circuit 130. In the embodiment, the data transfer interface circuit 130 is coupled to (also described as electrically connected to) the processor 110 and the host memory 120. In another embodiment, the processor 110, the host memory 120 and the data transfer interface circuit 130 are coupled to one another by using a system bus.

A storage device 20 includes a storage controller 210, a rewritable non-volatile memory module 220 and a connection interface circuit 230. The storage controller 210 includes a processor 211, a data management circuit 212 and a memory interface control circuit 213.

In the embodiment, the host system 10 is coupled to the storage device 20 via the data transfer interface circuit 130 and the connection interface circuit 230 of the storage device 20 to perform data-accessing operation. For example, the host system 10 may store the data in the storage device 20 or read data from the storage device 20 via the data transfer interface circuit 130.

In the embodiment, the processor 110, the host memory 120 and the data transfer interface circuit 130 may be disposed on a motherboard of the host system 10. The number of the data transfer interface circuit 130 may be one or more. Via the data transfer interface circuit 130, the motherboard may be coupled to the storage device 20 in a wired or a wireless manner. The storage device 20 may be, for example, a flash drive, a memory card, a solid state drive (SSD) or a wireless memory storage device. The wireless memory storage device may be, for example, a memory storage device using various wireless communication technologies such as a near field communication (NFC) memory storage device, a WiFi memory storage device, a Bluetooth memory storage device or a low-power consumption Bluetooth memory storage device (e.g., iBeacon) and so on. In addition, the motherboard may be coupled to various I/O devices such as a global positioning system (GPS) module, a network interface card, a wireless transfer device, a keyboard, a screen, a mouse, a speaker and so on via the system bus.

In the embodiment, the data transfer interface circuit 130 and the connection interface circuit 230 are interface circuits that are compatible with the Peripheral Component Interconnect Express (PCI Express) standard. Meanwhile, the transfer of data between the data transfer interface circuit 130 and the connection interface circuit 230 is performed by using a Non-Volatile Memory express (NVMe) communication protocol.

However, it should be understood that the invention is not limited thereto. The data transfer interface circuit 130 and the connection interface circuit 230 may comply with the Parallel Advanced Technology Attachment (PATA) standard, the Institute of Electrical and Electronic Engineers (IEEE) 1394 standard, the Serial Advanced Technology Attachment (SATA) standard, the Universal Serial Bus (USB) standard, the SD interface standard, the Ultra High Speed-I (UHS-I) interface standard, the Ultra High Speed-II (UHS-II) interface standard, the Memory Stick (MS) interface standard, the Multi-Chip Package interface standard, the Multi Media Card (MMC) interface standard, the eMMC interface standard, the Universal Flash Storage (UFS) interface standard, the eMCP interface standard, the CF interface standard, the Integrated Device Electronics (IDE) standard or other suitable standards. In addition, in another embodiment, the connection interface circuit 230 may be packaged in one chip along with the storage controller 210; alternatively, the connection interface circuit 230 may be disposed outside a chip containing the storage controller 210.

In the embodiment, the host memory 120 is used for temporarily storing the command or data executed by the processor 110. For example, in the exemplary embodiment, the host memory 120 may be a dynamic random access memory (DRAM), a static random access memory (SRAM) and so on; but it should be indicated that the invention is not limited thereto. The host memory 120 may be other suitable memories.

The storage controller 210 is used for executing a plurality of logic gates or control commands implemented in a hardware form or a firmware form, and perform data writing, data reading and data erasing operations in the rewritable non-volatile memory module 220 according to the command of the host system 10.

More specifically, the processor 211 of the storage controller 210 is a hardware that has a computing capability for controlling the overall operation of the storage controller 210. Specifically, the processor 211 includes a plurality of control commands. The control commands are executed to perform data writing, data reading and data erasing operations when the storage device 20 is operated.

It should be mentioned that, in the embodiment, the processor 110 and processor 211 are, for example, a central processing unit (CPU), a micro-processor, or other programmable unit (Microprocessor), a digital signal processor (DSP), a programmable controller, an application specific integrated circuit (ASIC), a programmable logic device (PLD) or other similar circuit component, which should not be construed as a limitation to the invention.

In one embodiment, the storage controller 210 further includes a read-only memory (not shown) and a random access memory (not shown). In particular, the read-only memory has a boot code. When the storage controller 210 is enabled, the processor 211 executes the boot code first to load the control command stored in the rewritable non-volatile memory module 220 into the random access memory of the storage controller 210. Thereafter, the processor 211 runs the control commands to perform data writing, data reading and data erasing operations and the like. In another embodiment, the control command of the processor 211 may be stored in a specific area of the rewritable non-volatile memory module 220, for instance, in a physical storage unit in the rewritable non-volatile memory module 220 that is specifically for storing system data, as a program code.

In the embodiment, as described above, the storage controller 210 further includes the data management circuit 212 and the memory interface control circuit 213. It should be pointed out that the operation executed by each component of the storage controller 220 may be regarded as the operation executed by the storage controller 220.

Specifically, the data management circuit 212 is coupled to the processor 211, the memory interface control circuit 213 and the connection interface circuit 230. The data management circuit 212 receives the command of the processor 211 to perform transfer of data. For example, data is read from the host system 10 (e.g. host memory 120) via the connection interface circuit 230, and the read data is written into the rewritable non-volatile memory module 220 via the memory interface control circuit 213 (e.g., perform writing operation according to the write command from the host system 10). In another example, the data is read from one or more physical units of the rewritable non-volatile memory module 220 via the memory interface control circuit 213, and the read data is written into the host system 10 via the connection interface circuit 230 (e.g., perform reading operation according to the read command from the host system 10). In another embodiment, the data management circuit 212 may be integrated into the processor 211.

The memory interface control circuit 213 receives the command of the processor 211, and performs the writing (also referred to as programming) operation, reading operation or erasing operation to the rewritable non-volatile memory module 220 in cooperation with the data management circuit 212.

For example, the processor 211 may execute a write command sequence to instruct the memory interface control circuit 213 to write the data into a physical unit (also referred to as target physical unit) of the rewritable non-volatile memory module 220; the processor 211 may execute a read command sequence to instruct the memory interface control circuit 213 to read data from one or more physical units of the rewritable non-volatile memory module 220 corresponding to the read command; the processor 211 may execute an erase command sequence to instruct the memory interface control circuit 213 to perform erasing operation on the rewritable non-volatile memory module 220. The write command sequence, the read command sequence and the erase command sequence may respectively include one or more program codes or command codes, and are used for instructing to perform corresponding writing, reading and erasing operations on the rewritable non-volatile memory module 220. In one embodiment, the processor 211 may further give other types of command sequence to the memory interface control circuit 213, so as to perform corresponding operations on the rewritable non-volatile memory module 220.

In addition, the data that is to be written into the rewritable non-volatile memory module 220 is converted into a format that can be accepted by the rewritable non-volatile memory module 220 via the memory interface control circuit 213. Specifically, if the processor 211 is to access the rewritable non-volatile memory module 220, the processor 211 transmits a corresponding command sequence to the memory interface control circuit 213 to instruct the memory interface control circuit 213 to perform the corresponding operation. For example, the command sequences may include the write command sequence that instructs to write data, the read command sequence that instructs to read data, the erase command sequence that instructs to erase data and corresponding command sequences for instructing to perform various memory operations (e.g., changing reading voltage set level or executing garbage collecting process and the like). The command sequences may include one or more signals or data on a bus. The signals or data may include a command code or a program code. For example, in the read command sequence, information such as identification code and memory address corresponding the reading are included therein.

The rewritable non-volatile memory module 220 is coupled to the storage controller 210 (memory interface control circuit 213) and stores the data written by the host system 10. The rewritable non-volatile memory module 220 may be flash memory modules such as a single level cell (SLC) NAND flash memory module (i.e., one memory cell can store one bit of flash memory module), a multi-level cell (MLC) NAND flash memory module (i.e., one memory cell can store two bits of flash memory module), a triple level cell (TLC) NAND flash memory module (i.e., one memory cell can store three bits of flash memory module), a 3D NAND flash memory module or a vertical NAND flash memory module or other memory module that has the same characteristics. The memory cells in the rewritable non-volatile memory module 220 are arranged in arrays.

In the embodiment, the memory cells of the rewritable non-volatile memory module 220 construct a plurality of physical programming units (also referred to as physical sub-units), and the physical programming units construct a plurality of physical blocks (also referred to as physical erasing units or physical units). Specifically, the memory cells on the same word line (or the same word line layer) make up one or more physical programming units.

In the embodiment, the physical sub-unit serves as the minimum unit for writing (programming) data. The physical unit is the minimum unit for erasing operation, that is, each physical unit includes a smallest number of memory cell that is erased altogether. Each physical unit includes a plurality of physical sub-units. The physical sub-units may be a physical page or a physical sector. In the embodiment, the physical sub-unit includes a data bit area and a redundancy bit area. The data bit area stores user data, and the redundancy bit area stores system data. The system data is, for example, an error correction code, and an error check code or meta data.

It should be indicated that, in the embodiment, the system data for recording the information of one physical unit may be recorded by using one or more physical sub-units in the physical unit, or recorded by using one or more physical sub-units of a specific physical unit, which is for recording all system data, in one system area. In the embodiment, the system data corresponding to one physical unit includes information such as a timestamp (also known as global timestamp) of the physical unit. The amount (value difference) of the timestamps may represent a time sequence that shows the earliest times at which the corresponding physical units are used; the invention provides no limitation to the detailed format of the timestamp. For example, every time when the processor 211 performs data writing operation on a physical unit selectively allocated in a free area (spare area), the physical unit would be allocated to a data area (e.g., the physical unit becomes an open physical unit), and a timestamp of the physical unit records the current storage device time or the system time. That is to say, if a timestamp of one physical unit is larger than (later than) a timestamp of another physical unit, such situation represents that the physical unit is allocated to the data area at an earlier time than another physical unit (or selected to be used by the processor 211 at an earlier time).

Moreover, in the embodiment, when writing the logical-to-physical table or the physical-to-logical table into the rewritable non-volatile memory module 220 is completed, the processor 211 also adds the timestamp to the written logical-to-physical table or the physical-to-logical table, so as to record the time at which the logical-to-physical table or the physical-to-logical table is written into the rewritable non-volatile memory module 220.

The data writing operation, for example, is performed by programming corresponding data to one or more physical pages (i.e., physical sub-units) of the physical unit according to the data writing command corresponding to one or more logical addresses, or, for example, programming data to other forms of physical address (e.g., physical sector) of the physical unit. In the embodiment, when the data writing operation (e.g., corresponding data is programmed to a physical page) corresponding to a logical page (logical address) is completed, the processor 211 correspondingly updates the logical-to-physical table to record an address (physical address) of the physical page corresponding to the logical address. In addition, the processor 211 records the corresponding meta data to a redundancy bit area corresponding to the physical page. In the embodiment, the meta data may record the logical address mapped by the physical page. In another embodiment, the meta data may also record a timestamp corresponding to the writing operation. That is, when the data writing operation of the physical page is completed, the processor 211 can record one timestamp to record the current time at which the data writing operation of the physical page is completed.

The host system 10 allocates a plurality of logical units to the rewritable non-volatile memory module 220 via the storage controller 210. The allocated logical units is configured to access the user data stored in the plurality of physical units of the rewritable non-volatile memory module 220. Here, each of the logical units may be made up of one or more logical addresses. For example, the logical unit may be a logical block, a logical page or a logical sector. One logical unit may be mapped to one or more physical units, wherein the physical unit may be one or more physical addresses, one or more physical sectors, one or more physical programming units or one or more physical erasing units.

In the following embodiments, for ease of description, the logical unit is a logical block; a logical sub-unit refers to a logical page, and the logical address refers to a corresponding logical page or an address thereof. Each of the logical unit has a plurality of logical pages (logical addresses); the physical unit refers to a physical block, the physical sub-unit refers to a physical page, and the physical address refers to a corresponding physical page or an address thereof. However, in another embodiment, one physical unit/physical sub-unit may respectively refer to a constitution of a random number of memory cell depending on the actual need. Meanwhile, the physical address may refer to a physical block or an address of a physical page.

Furthermore, the storage controller 210 establishes a logical-to-physical table and a physical-to-logical table so as to record a mapping relationship between the logical unit (e.g., logical block, logical page, logical address or logical sector) and the physical unit (e.g., physical erasing unit, physical programming unit, physical address or physical sector) that are allocated to the rewritable non-volatile memory module 220. That is to say, the storage controller 210 may find the physical unit mapped by one logical unit via the logical-to-physical table, and the storage controller 210 may find the logical unit mapped by one physical unit via the physical-to-logical table. However, the above technical concept regarding mapping the logical unit and the physical unit is a conventional technical means known to persons skilled in the art, and thus no further descriptions are incorporated herein.

In one embodiment, the storage controller 210 further includes a buffer memory and a power management circuit. The buffer memory is coupled to the processor 211 for temporarily storing the data and command from the host system 10, the data from the rewritable non-volatile memory module 220 or other system data (e.g., logical-to-physical table and physical-to-logical table, trim information list and so on) for managing the storage device 20, such that the processor 211 can access the data, command or system data quickly from the buffer memory. The power management circuit is coupled to the processor 211 for controlling the power of the storage device 20.

Details of the data backup method provided by the invention are described with reference to FIG. 1, FIG. 2, FIG. 5A to FIG. 5C and a first embodiment.

First Embodiment

Figure 5A:
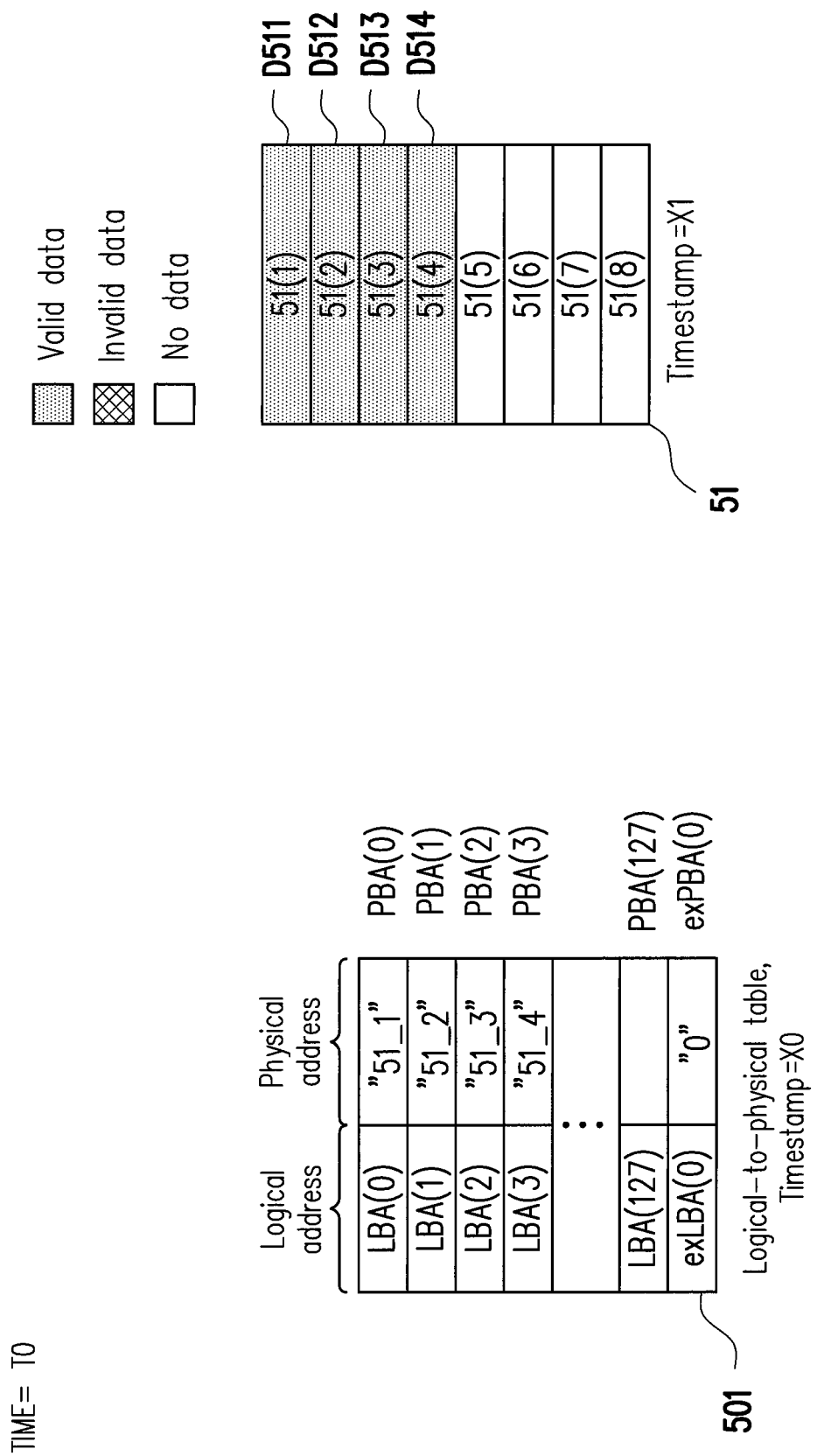
FIG. 5A is a schematic diagram of a logical-to-physical table according to a first embodiment of the invention.
Figure 5B:
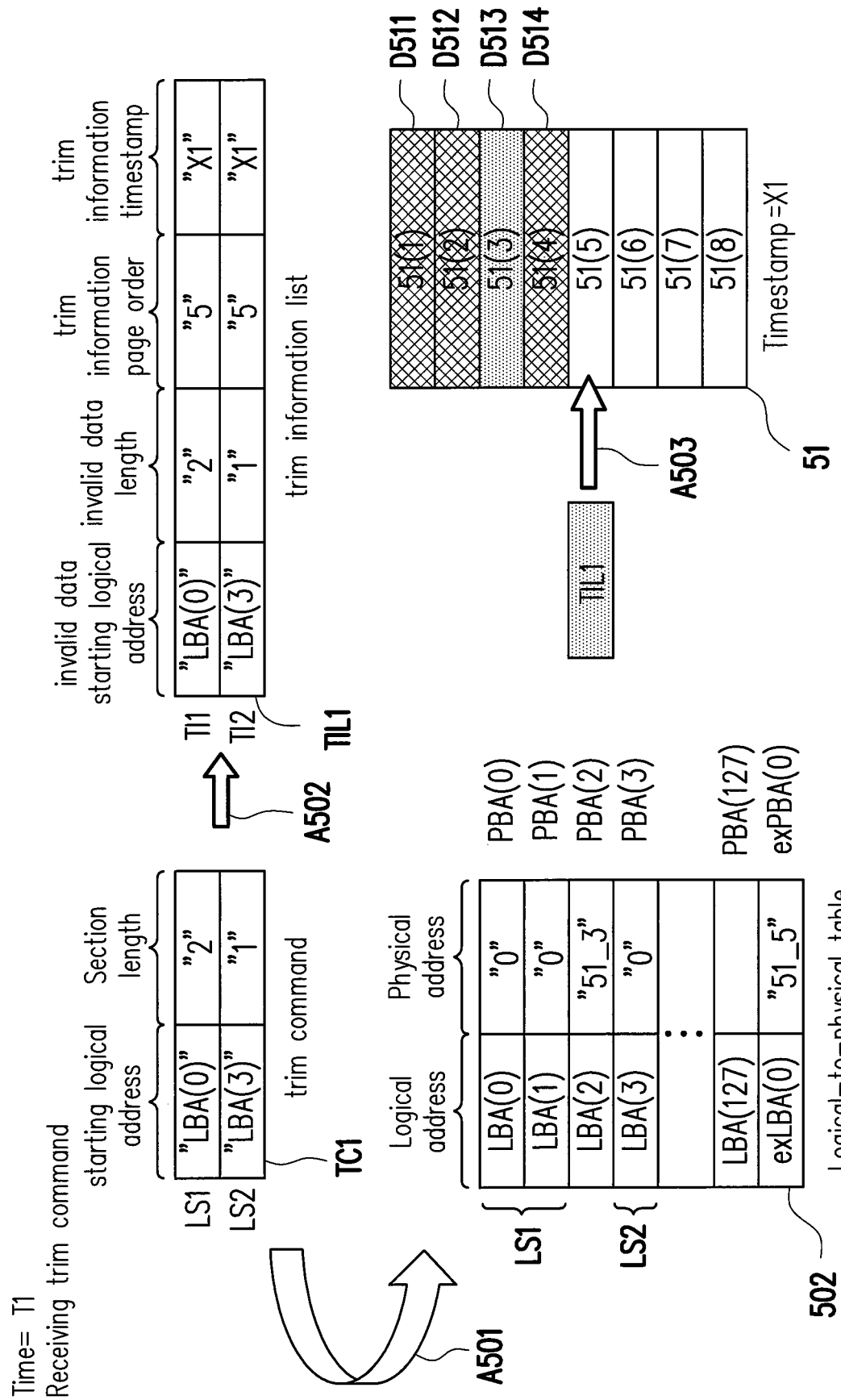
FIG. 5B to FIG. 5C are schematic diagrams of a data backup method according to a first embodiment of the invention.
Figure 5C:
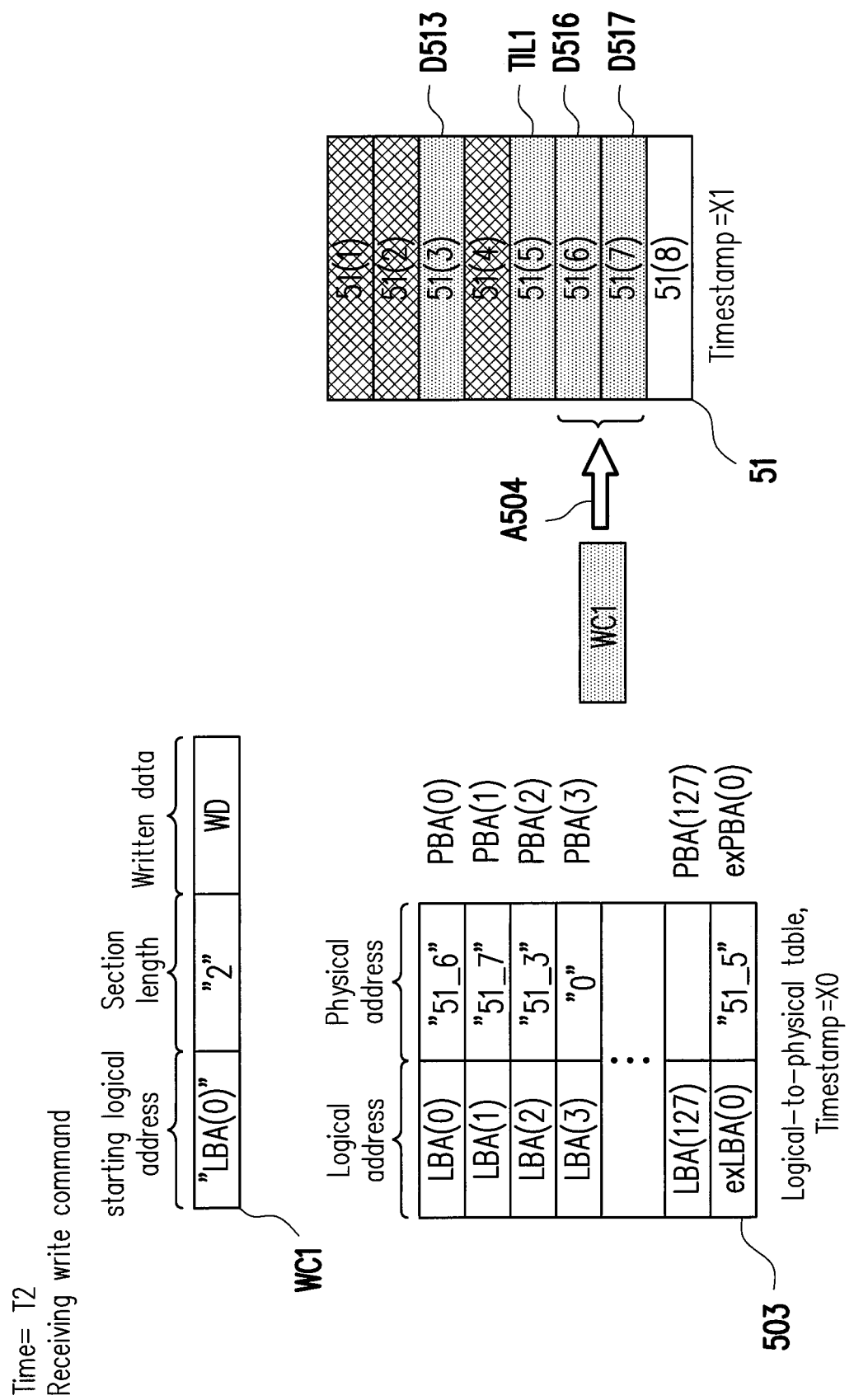

FIG. 5A is a schematic diagram of a logical-to-physical table according to a first embodiment of the invention. FIG. 5B to FIG. 5C are schematic diagrams of a data backup method according to the first embodiment of the invention. Referring to FIG. 5A, for example, in the embodiment, for ease of description, assuming that the host system is configured for storing 128 logical addresses (logical pages) LBA(0) to LBA (127) of the data. The rewritable non-volatile memory module 220 is allocated with a plurality of physical units. Each of the physical units has 8 physical pages. For example, the physical unit 51 has 8 physical pages 51(1) to 51(8). A timestamp of the physical unit 51 is "X1".

The processor 211 maintains a logical-to-physical table 501 in the memory (e.g., buffer memory). In the embodiment, the initial logical-to-physical table 501 is read a logical-to-physical table backup data previously backed up (stored) in the rewritable non-volatile memory module 220, and the timestamp thereof is "X0". The logical-to-physical table 501 records 128 logical addresses LBA(0) to LBA (127) and corresponding physical addresses PBA(0) to PBA (127). Furthermore, the logical-to-physical table may also record an extended logical address. For example, the logical-to-physical table 501 records an extended logical address exLBA(0) and a corresponding physical address exPBA(0). The extended logical address is not managed or recognized by (the operating system of) the host system 10, and the invention provides no limitation to the size of the extended logical address. That is, the overall space of the extended logical address may be larger than or smaller than the size of all of the logical addresses allocated by the operating system of the host system.

Assuming that the plurality of logical addresses read from the logical-to-physical table 501 of the rewritable non-volatile memory module 220 do not record any value. At a time T0, assuming that data D511, D512, D513, D514 are written into the first, second, third and fourth physical pages (physical address) (i.e., physical pages 51(1) to 51(4)) of the physical unit 51, wherein the data D511, D512, D513 and D514 are stored in the logical addresses LBA(0), LBA(1), LBA(2), LBA(3). Correspondingly, the physical addresses PBA(0), PBA(1), PBA(2) and PBA(3) respectively correspond to the logical addresses LBA(0), LBA(1), LBA(2), LBA(3) recorded by the logical-to-physical table 501 currently maintained in the memory record "51_1", "51_2", "51_3" and "51_4". The example represents that valid data (e.g., a gray block of the physical unit 51 shown in FIG. 5A), such as D511, D512, D513 and D514, is stored in the first, second, third and fourth physical pages (physical addresses) in the physical unit 51. In addition, as shown in FIG. 5A, the physical pages 51(5) to 51(8) are not stored any data (i.e., no data, as shown in a blank block of physical unit 51 in FIG. 5A). It should be mentioned that, based on comparisons of timestamps, it can be obtained that the earliest time at which the physical unit 51 is used is later than a time at which the initial logical-to-physical table 501 is stored into the rewritable non-volatile memory module 220 ("X1" is larger than "X0"). In other words, before the valid data D511, D512, D513, and D514 are written into the physical unit 51, the initial logical-to-physical table 501 is backed up into the rewritable non-volatile memory module 220. It should be pointed out that if there is no data stored in one logical address of the logical-to-physical table, the information recorded by the physical address corresponding to the logical address may be blank/none/empty (i.e., no information is stored). For example, if there is no data stored in the logical address LBA(127), the physical address PBA(127) corresponding to (mapped by) the logical-to-physical table 501 does not record any information (as shown in FIG. 5A, the physical address PBA(127) corresponding to the LBA(127) does not record any information). In another embodiment, if there is no valid data in the physical address corresponding to one logical address, the logical address is deleted from the logical-to-physical table.

Figure 2:
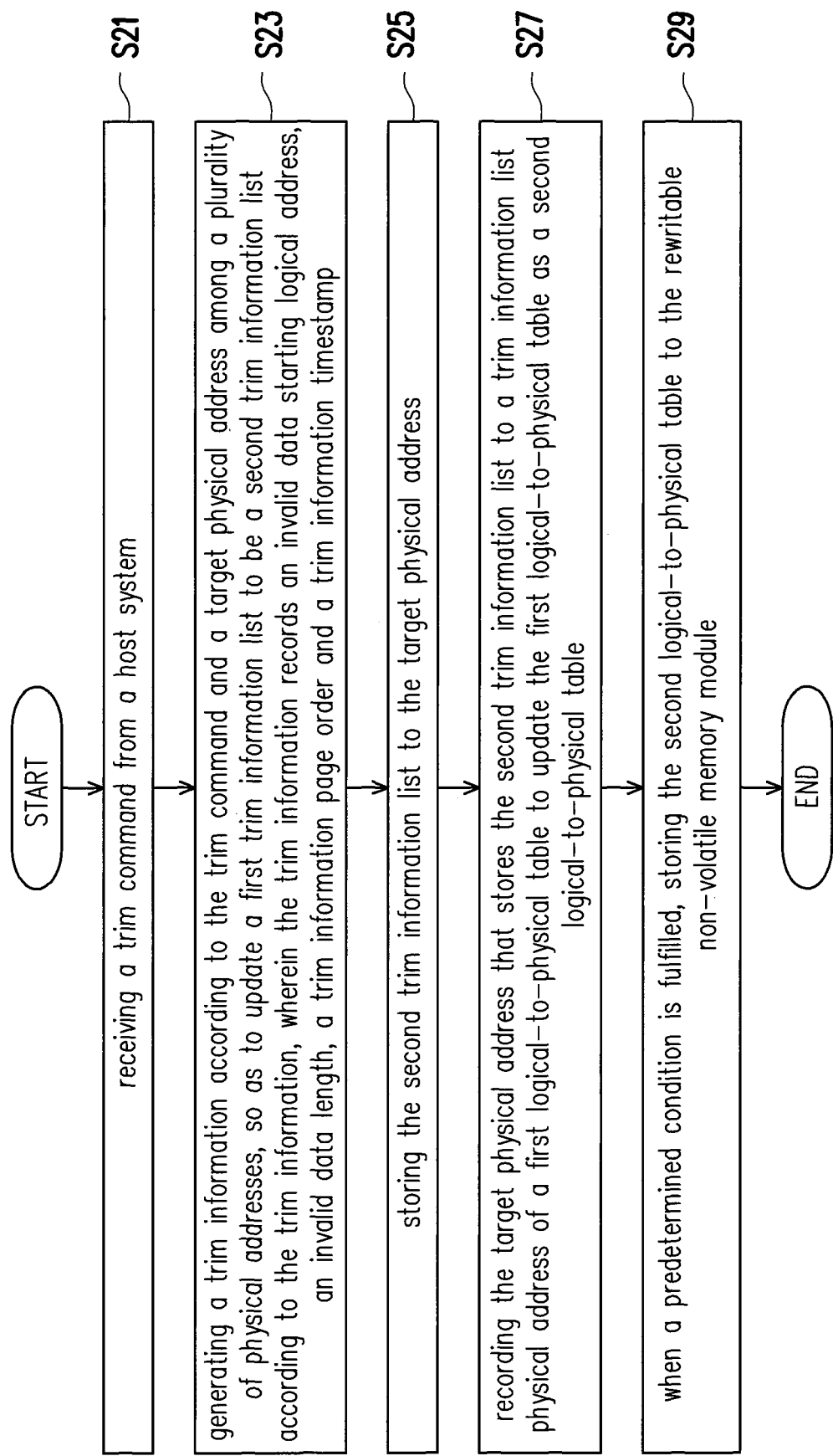
FIG. 2 is a flowchart illustrating a data backup method according to an embodiment of the invention.

FIG. 2 is a flowchart of a data backup method according to an embodiment of the invention. Referring to FIG. 1 and FIG. 2, in step S21, the processor 211 receives a trim command from a host system 10. The trim command indicates an invalid data stored in the logical address section. Specifically, as mentioned above, when the operating system installed in the host system 10 deletes certain data, the operating system can let the storage device 20 know (processor 211) which one of the logical address sections that the deleted data is located at (i.e., logical address(es) from which the data is deleted by the operating system) via transmitting the trim command to the storage device 20 (processor 211). That is to say, the processor 211 of the storage device 20 can know that the data is stored in one logical address sections is invalid via the received trim command.

For example, referring to FIG. 5B, assuming that at a time T1, the processor 211 receives a trim command TC1 from the host system 10, the trim command TC1 indicates that the data in two logical address sections LS1 and LS2 is deleted (becomes invalid). The trim command TC1 uses two information to record the logical address sections LS1 and LS2; for example, the starting logical address represents (records) the first (the most front) logical address (logical page) of the logical address section, and the section length represents (records) the total length of the logical address section, that is, the total number of all logical addresses (logical pages) included in the corresponding logical address section. For example, based the starting logical address "LBA(0)" and section length "2" of the logical address section LS1 indicated by the trim command TC1, it can be obtained that the data in a total of "2" logical addresses currently stored in the logical address LBA(0) and logical address LBA(1) becomes invalid data. It should be indicated that the time T1 represents a time point that is later than the time T0. In addition, the invention provides no limitation to the structure of the logical-to-physical table. For example, in another embodiment, the logical-to-physical table utilizes only one data column to regularly record the physical address mapped by all logical addresses in sequence.

Referring to FIG. 2, next, in step S23, the processor 211 generates a trim information according to the trim command and a target physical address among a plurality of physical addresses, so as to update the first trim information list as the second trim information list according to the trim information, wherein the trim information records an invalid data starting logical address, an invalid data length, a trim information page order and a trim information timestamp. The first trim information list refers to an old trim information list; the second trim information list refers to a new trim information list generated according to the currently received trim command (and the first trim information list).

Referring to FIG. 5B, for example, further to the example provided above, after the trim command TC1 is received, the processor 211 generates (update) the trim information list TIL1 (as denoted by arrow A502) according to the information of the trim command TC1. The trim information list TIL1 is maintained in the buffer memory (hereafter "memory"). Corresponding to the two logical address sections LS1 and LS2 of the trim command TC1, the generated trim information list TIL1 also records two trim information. In order to generate the two trim information of the trim information list, the processor 211 records the starting logical address of the logical address section as the invalid data starting logical address of the trim information according to the received trim command, and records the section length of the logical address section as the invalid data length of the trim information. For example, in terms of the logical address section LS1, the invalid data starting logical address of the trim information TI1 that is generated corresponding to the logical address section LS1 is "LBA(0)", which is the same as the starting logical address "LBA(0)" of the logical address section LS1. The invalid data length of the trim information TI1 is "2", which is the same as the section length "2" of the logical address section LS1.

Next, the processor 211 identifies an available physical unit among the plurality of physical units in the rewritable non-volatile memory module 220 as the target physical unit, and identifies an available target physical page among the plurality of physical pages of the target physical unit. For example, the physical unit 51 that is currently in use and not fully written is identified as an available physical unit (identified as a target physical unit) (also called as "open physical unit"), and blank (empty) physical pages 51(5) to 51(8) are available physical pages. In this example, as denoted by arrow A503, the processor 211 selects the physical page 51(5) that is in the first order among the physical pages 51(5) to 51(8) as the target physical page, so as to store the trim information list TIL1. In addition, the processor 211 identifies the timestamp (i.e., "X1") of the target physical unit 51, and identifies the order (i.e., page order) of the target physical page 51(5) among all of the physical pages 51(1) to 51(8) of the target physical unit 51. Thereafter, the processor 211 records the page order corresponding to the target physical page as the trim information page order of the trim information according to the target physical address, and records the timestamp of the target psychical unit as the trim information timestamp of the trim information. That is, according to the order (the fifth physical page) of the target physical page, which is to store the trim information list TIL1, in the target physical unit 51, the trim information page order of the trim information TI1 is recorded as "5". According to the timestamp of the target physical unit 51, the trim information timestamp of the trim information TI1 is recorded as "X1". When all kinds of information of one trim information is recorded, the generation of the trim information is completed. The generated trim information is recorded (added to) in the trim information list maintained in the memory.

Similar to the method described above, the processor 211 generates the trim information TI2 according to the logical address section LS2, and adds the trim information TI2 to the trim information list TIL1. As mentioned above, in the embodiment, the trim information TI2 is added behind the trim information TI1 in the previously generated trim information list TIL1. In addition, corresponding to every received trim command, all of the trim information lists that are currently maintained in the memory are generated (or updated). That is, if there has been no trim information list in the memory, the processor 211 would create a new trim information list (e.g., the second trim information list) in the memory according to the currently received trim command, and generates corresponding trim information into the created trim information list according to the currently received trim command. If there is already a trim information list (e.g., first trim information list) existed in the memory, the processor 211 generates and adds the corresponding trim information behind the other trim information in the existing trim information list according to the currently received trim command, so as to generate (updated) a new second trim information list that is different from the old first trim information list.

After generating (or updating) of the trim information list is completed, during step S25, the processor 211 stores the second trim information list into the target physical address. That is, corresponding to the new trim information list that is generated according to every received trim command, the processor 211 writes the newly generated trim information list (including all of the trim information in the old trim information list and the trim information generated in corresponding to the current trim command) into the target physical page 51(5) of the rewritable non-volatile memory module 220. It should be pointed out that the invention provides no limitation to the number of the target physical page.

On the other hand, the processor updates the logical-to-physical table 501 as the logical-to-physical table 502 (as indicated by arrow A501) according to the logical address sections LS1 and LS2 indicated by the trim command TC1. More specifically, the processor 211 clears the physical addresses PBA(0) and PBA(1) respectively corresponding to the logical addresses LBA(0) and LBA(1) of the logical-to-physical table according to the logical address section LS1 (e.g., the information "51_1" recorded by the physical address PBA(0) is modified to "0", and the information "51_2" recorded by the physical address PBA(1) is modified to "0"). Similarly, the information recorded by the physical address PBA(3) corresponding to the logical address LBA(3) is also cleared according to the logical address section LS2. In other words, the data stored in the physical pages 51(1), 51(2) and 51(4) of the physical unit 51 are regarded as invalid data (as represented by the diamond grid lines) by the processor 211.

Subsequently, in step S27, the processor 211 records the target physical address for storing the second trim information list into the trim information list physical address of the first logical-to-physical table to update the first logical-to-physical table as a second logical-to-physical table. For example, the target physical address of the target physical page 51(5) for storing the second trim information list is "51_5", and such information (i.e., "51_5") is recorded in the trim information list physical address exPBA(0) corresponding to the extended logical address exLBA(0) of the logical-to-physical table 501, so as to update the logical-to-physical table 501 (also referred to as first logical-to-physical table) as the logical-to-physical table 502 (also referred to as second logical-to-physical table).

In addition, in step S29, when a predetermined condition is fulfilled, the processor 211 may store the second logical-to-physical table into the rewritable non-volatile memory module. Specifically, the logical-to-physical table 502 updated in steps S21 to S27 is stored into the rewritable non-volatile memory module 220 when the predetermined condition is fulfilled. The predetermined condition is, for example, after a fixed free time has elapsed, the size of the trim information list exceeds a predetermined size, a time interval between the current time and the timestamp of the logical-to-physical table exceeds a predetermined time threshold, the invalid data indicated by the received trim command exceeds another predetermined size or a combination thereof.

It should be indicated that, as described above, the processor 211 updates the logical-to-physical table in corresponding to the data writing operation. Referring to FIG. 5C, for example, assuming that the processor 211 receives a write command WC1 at a time T2 later than the time T1. The write command WC1 includes an starting logical address, a section length and a written data. More specifically, the write command instructs the processor 211 to write the written data WD into a total of two logical addresses (logical pages), namely the logical addresses LBA(0) and LBA(1). That is, the logical section for storing the written data WD includes "2" logical pages, and the logical address of the first logical page is LBA(0). The processor 211 stores the written data WD into the physical pages 51(6) and 51(7) (as shown by arrow A504) of the currently available physical unit 51 in order according to the write command WC1. In other words, the data D516 and D517 stored in the physical pages 51(6) and 51(7) may constitute the written data WD. It should be mentioned that the data TIL1 stored in the physical page 51(5) is the trim information list TIL1 previously written thereto.

The data recovery method provided by the first embodiment is described with reference to FIG. 3, FIG. 4 and FIG. 5D to FIG. 5F, which utilizes the trim information list generated and stored via the aforementioned data backup method.

Figure 3:
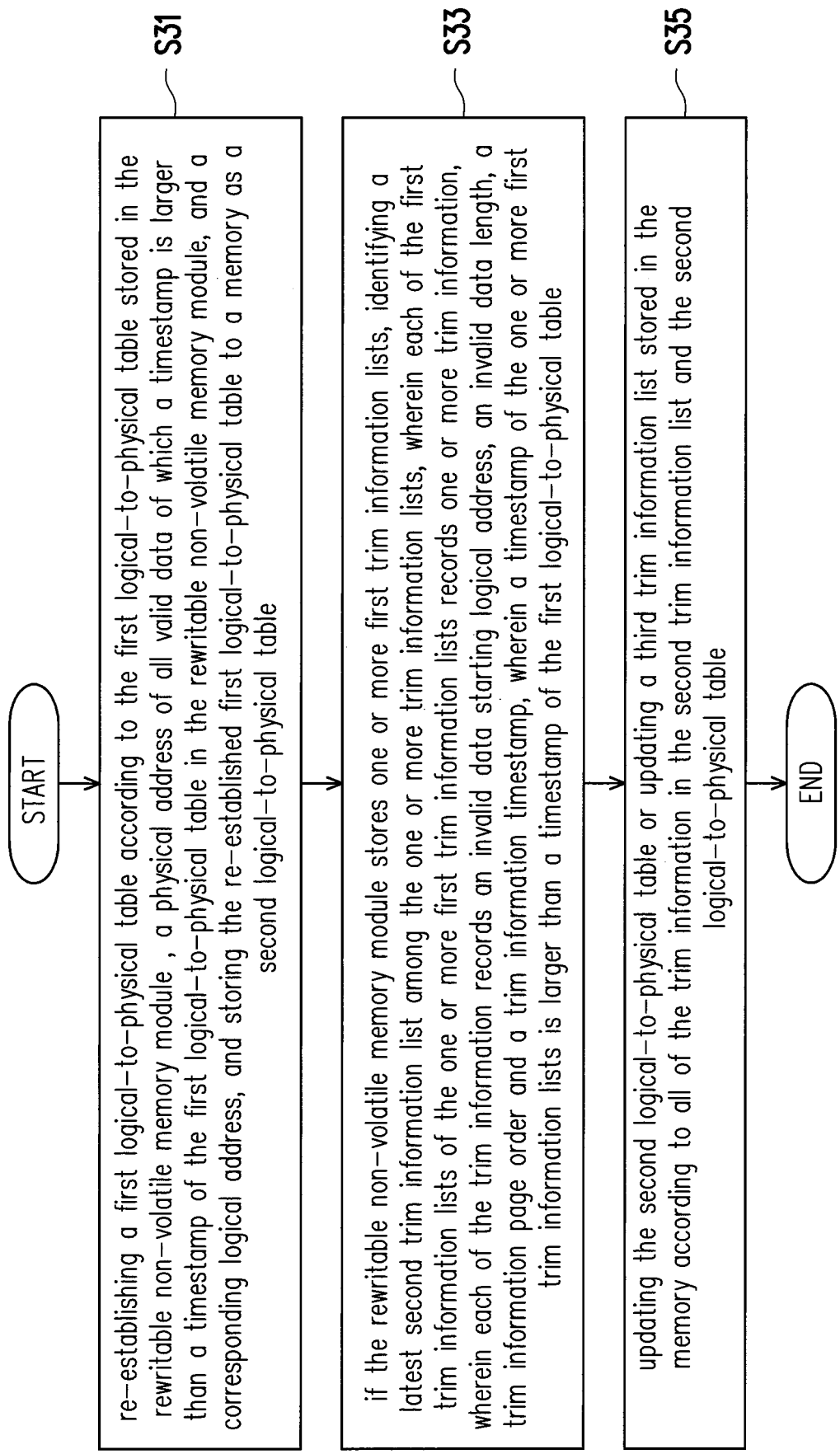
FIG. 3 is a flowchart illustrating a data recovery method according to an embodiment of the invention.
Figure 5D:
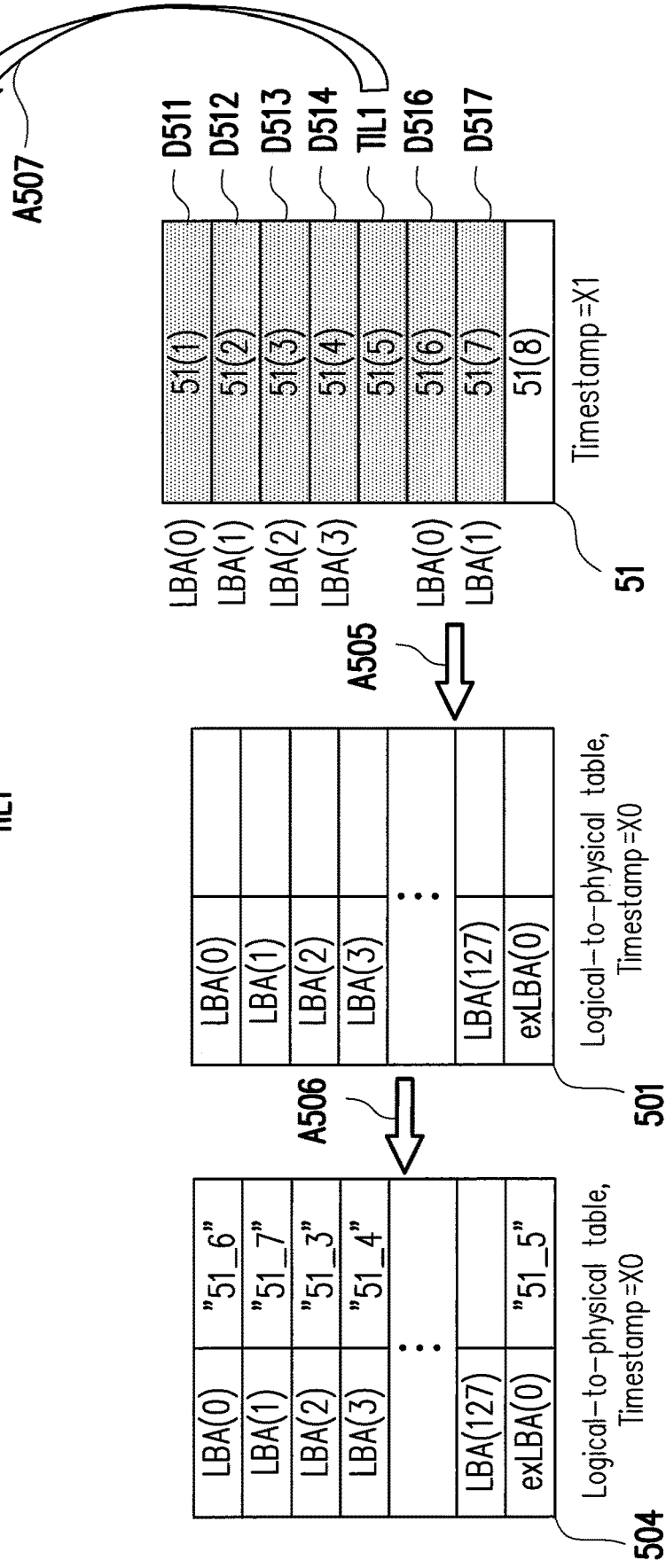
FIG. 5D to FIG. 5F are schematic diagrams s of a data recovery method according to a first embodiment of the invention.
Figure 5E:
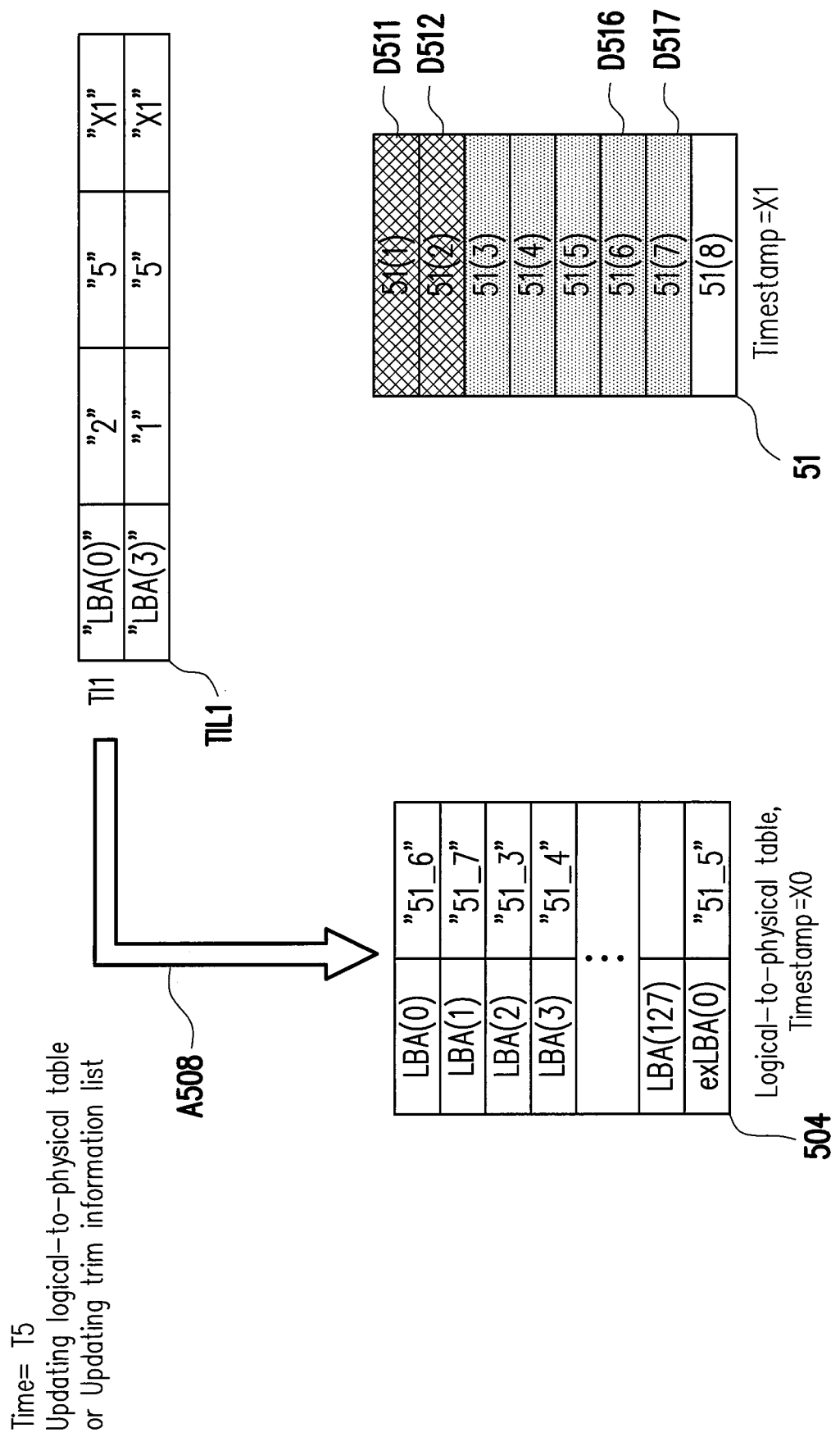
Figure 5F:
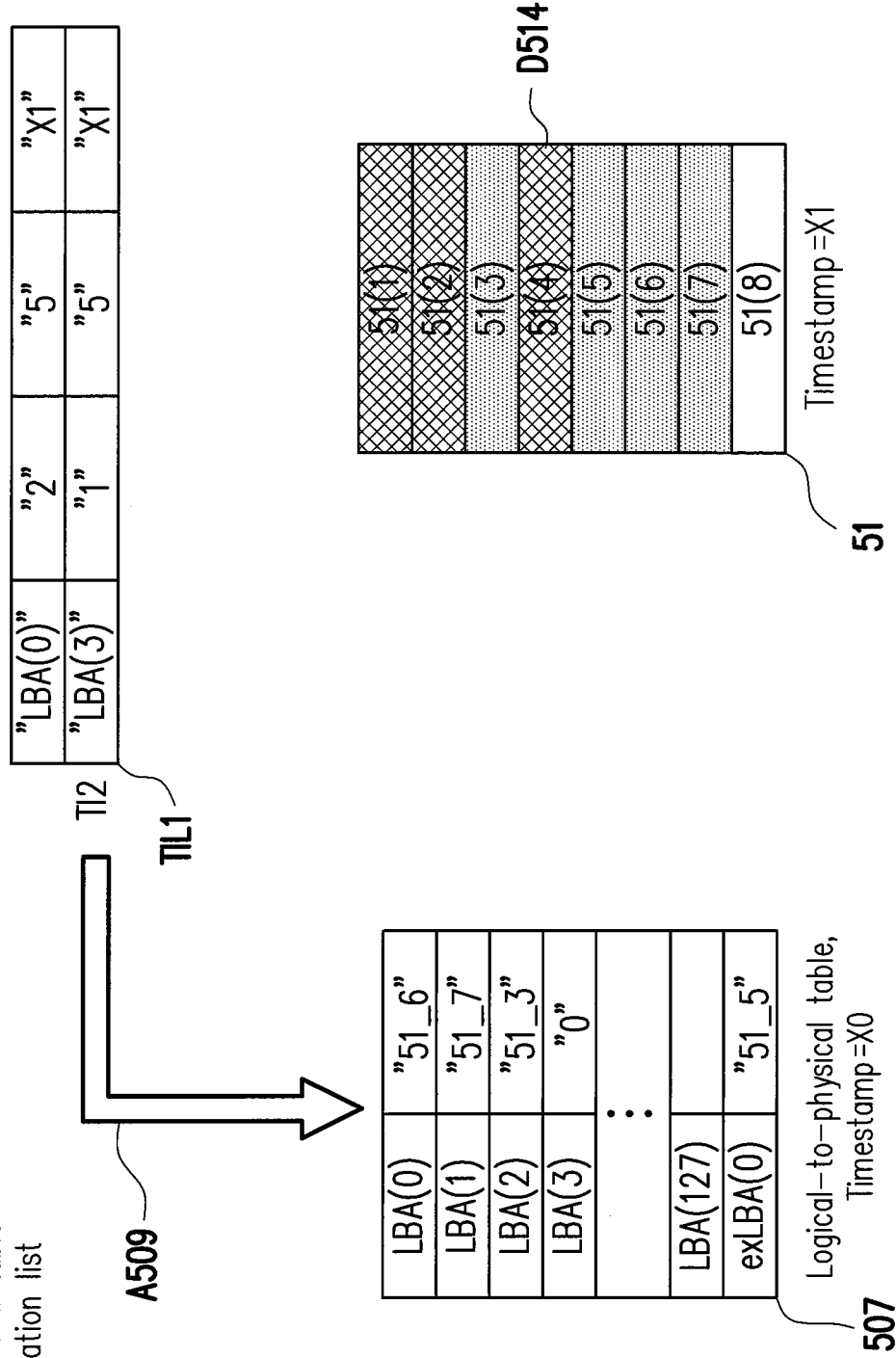

FIG. 3 is a flowchart illustrating a data recovery method according to an embodiment of the invention. FIG. 5D to FIG. 5F are schematic diagrams of a data recovery method according to the first embodiment of the invention. Referring to FIG. 3 first, in step S31, the processor 211 re-establishes a first logical-to-physical table according to the first logical-to-physical table stored in the rewritable non-volatile memory module, a physical address(es) of all valid data of which a timestamp is larger than a timestamp of the first logical-to-physical table in the rewritable non-volatile memory module, and a corresponding logical address, and stores the re-established first logical-to-physical table to a memory as the second logical-to-physical table.

For example, referring to FIG. 5D, further to the examples in FIG. 5A to FIG. 5C, assuming that a sudden-power-off event occurred at a time T3 (e.g., the power of the storage device is suddenly lost at time T3) later than the time T2. Since the trim information list TIL1 and the logical-to-physical table 503 that are originally (e.g., at time T2) stored in the memory are lost due to the sudden-power-off event, after the storage device 20 is turned on, the processor 211 detects the occurrence of the sudden-power-off event, and performs data recovery operation correspondingly. In the data recovery operation, at a time T4 which is later than the time T3, the processor 211 re-establishes the logical-to-physical table first. Specifically, the processor 211 reads the latest stored logical-to-physical table 501 from the rewritable non-volatile memory module 220 (and store it) to the memory, and reads the meta data corresponding to the physical page that is written with any data to find out the address and corresponding valid data of the physical page of which the timestamp is larger than the timestamp of the logical-to-physical table 501 (i.e., the processor 211 searches for all of the physical pages where the write time is later than the backup time of the logical-to-physical table 501). Subsequently, the processor 211 updates the logical-to-physical table 501 according to the corresponding logical address recorded by the meta data of the physical pages.

For example, the processor 211 has identified that the timestamp "X1" of the physical unit 51, to which the data D511, D512, D513, D514, TIL1, D516, D517 belong and respectively stored in the physical pages 51(1) to 51(7) of the current physical unit 51, is larger than the timestamp "X0" of the logical-to-physical table 501. That is, the time at which the data D511, D512, D513, D514, TIL1, D516 and D517 are written is later than a time at which the (initial) logical-to-physical table 501 is backed up to the rewritable non-volatile memory module 220. Therefore, the processor 211 performs data recovery operation according to the data D511, D512, D513, D514, TIL1, D516 and D517. The processor 211 determines the degree of accuracy of the mapping relationship of the corresponding logical address based on the timestamp of the data D511, D512, D513, D514, TIL1, D516 and D517 and the order (i.e., the time at which the data D511, D512, D513, D514, TIL1, D516 and D517 are written into the rewritable non-volatile memory module 220) of the corresponding physical page (physical address). In other words, if two different physical addresses correspond to the same logical address, the processor 211 performs mapping operation based on the physical address with the larger timestamp, that is, mapping the logical address to the physical address with larger timestamp. In the embodiment, the processor re-establishes (update) the logical-to-physical table (as indicated by arrow A505) based on the user data (e.g., via the data D511, D512, D513, D514, D516, D517 that are written through data writing operation from the host system).

For example, the processor 211 identifies that, according to the meta data corresponding to different physical pages, the logical address corresponding to the physical page 51(1) is LBA(0), the logical address corresponding to the physical page 51(2) is LBA(1), the logical address corresponding to the physical page 51(3) is LBA(2), the logical address corresponding to the physical page 51(4) is LBA(3), the logical address corresponding to the physical page 51(5) is LBA(0), and the logical address corresponding to the physical page 51(6) is LBA(1). As for the data D511, D512, D516 and D517 with overlapped logical addresses (e.g., LBA(0) and LBA(1)), the processor 211 determines that the data D516 and D517 are valid data that respectively correspond to the logical units LBA(0) and LBA(1) according to the order of the corresponding physical pages 51(1), 51(2), 51(6) and 51(7) (because the orders of D516 and D517 are behind the orders of D511 and D512), and determines that the data D511 and D512 are invalid data that respectively correspond to the logical units LBA(0) and LBA(1). The processor 211 reflects the identification result to the logical-to-physical table 501 (as indicated by arrow A506), so as to complete the operation of re-establishing the logical-to-physical table 501 to logical-to-physical table 504. In other words, based on the re-established logical-to-physical table 504, the processor 211 can know that the data D511 and D512 currently stored in the physical pages 51(1) to 51(2) are invalid data (e.g., as marked with diamond grid lines in FIG. 5E).

In addition, the processor 211 records the physical address (i.e., "51_5") of the trim information list TIL1 with a timestamp larger than the timestamp of the logical-to-physical table 501 to the physical address exPBA(0) corresponding to the logical address exLBA(0) of the logical-to-physical table 501.

After operation of re-establishing the logical-to-physical table is completed, in step S33, if the rewritable non-volatile memory module stores one or more first trim information list, the processor 211 identifies the latest second trim information list among the one or more first trim information lists, wherein each of the first trim information list among the one or more first trim information lists records one or more trim information, wherein each of the trim information records invalid data starting logical address, invalid data length, trim information page order and trim information timestamp, wherein the timestamp of the one or more first trim information lists is larger than the timestamp of the first logical-to-physical table. Specifically, as described above, the processor 211 uses the method of comparing timestamps to identify the latest one among the one or more trim information lists (also referred to as first trim information list), which are newer as compared with the logical-to-physical table 501 (i.e., that are stored into the rewritable non-volatile memory module 200 at a later time than the logical-to-physical table 501, stored in the rewritable non-volatile memory module. For example, in the first trim information lists, the trim information list (also referred to as second trim information list) which has largest number of trim information (since the trim information in the trim information list is continuously added/updated as time goes by) is determined as the latest trim information list. The data structure of the trim information list/trim information are described above and thus no further descriptions are incorporated herein. As the example shown in FIG. 5D, the processor 211 identifies the second trim information list TIL1, and reads the second trim information list TIL1 into the memory (as indicated by arrow A507).

Thereafter, in step S35, the processor 211 updates the second logical-to-physical table or updates a third trim information list stored in the memory according to all of the trim information in the second trim information list and the second logical-to-physical table. The detailed process of step S35 is described below with reference to FIG. 4.

Figure 4:
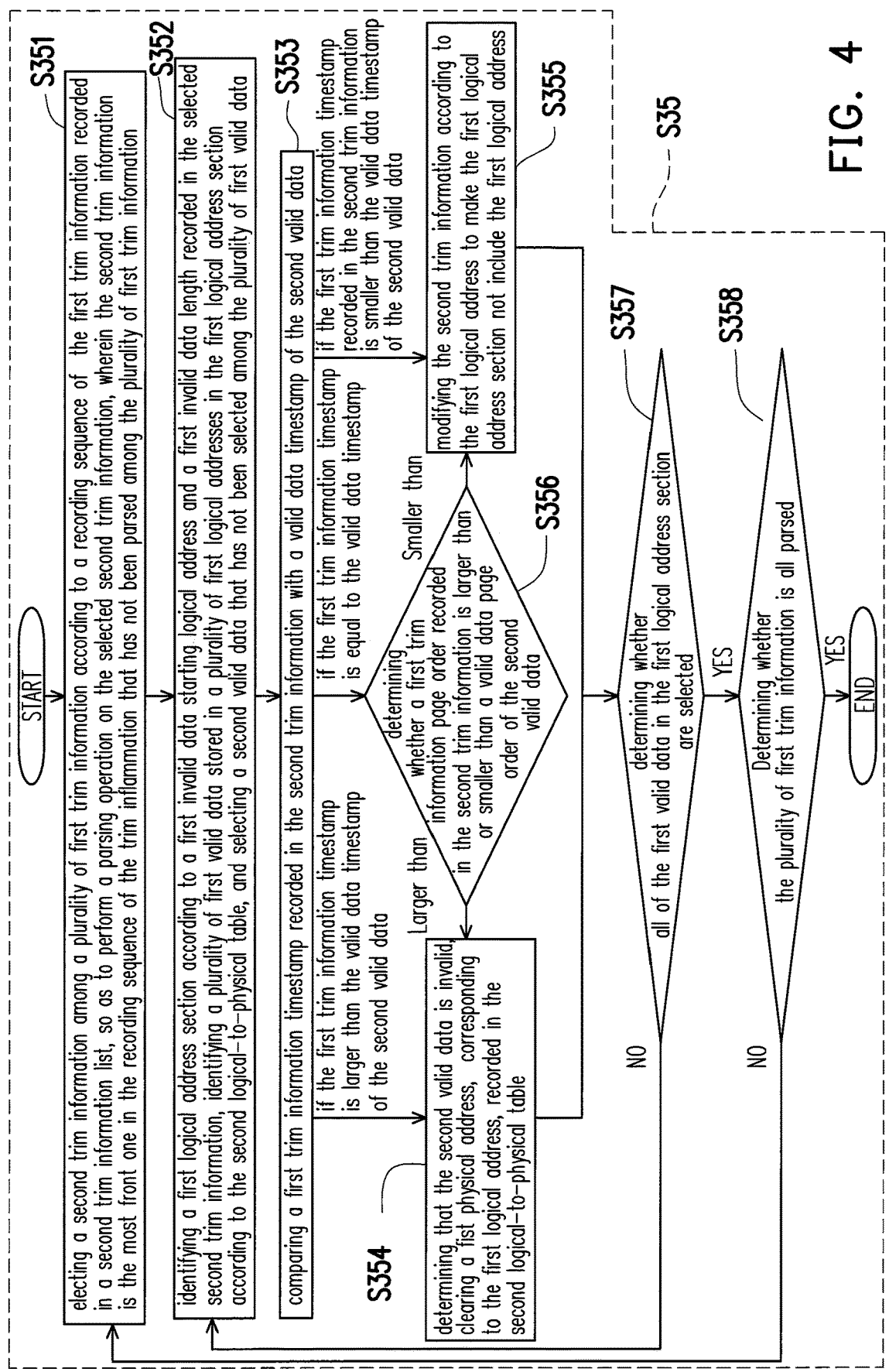
FIG. 4 is a flowchart of step S35 in FIG. 3 according to an embodiment of the invention.

FIG. 4 is a flowchart of step S35 in FIG. 3 according to an embodiment of the invention. Referring to FIG. 4, in step S351, the processor 211 selects the second trim information among a plurality of first trim information according to a recording sequence of the plurality of first trim information recorded in the second trim information list, so as to perform a parsing operation on the selected second trim information, wherein the second trim information is the most front one in the recording sequence of the trim information that has not been parsed among the plurality of first trim information. For example, further to the example of FIG. 5D, referring to FIG. 5E, the processor 211 performs parsing operation on the trim information TI1 and TI2 (also referred to as first trim information) according to the trim information list TIL1 in the memory. First of all, at a time T5, the processor 211 performs the parsing operation (as indicated by arrow A508) on the trim information TI1 (also referred to as second trim information) that is in the first order of the trim information TI1 and TI2 that have not been selected to be parsed.

Thereafter, the processor 211 begins to perform the parsing operation on the selected trim information TI1. In step S352, the processor 211 identifies a first logical address section according to a first invalid data starting logical address and a first invalid data length recorded by the selected second trim information. The processor 211 identifies a plurality of first valid data stored in a plurality of first logical addresses in the first logical address section according to the second logical-to-physical table, and selects a second valid data that has not been selected among the plurality of the first valid data.

For example, the first logical address section that stores the invalid data is identified according to the invalid data starting logical address (also referred to as first invalid data starting logical address) of the trim information TI1 and the invalid data length (also referred to as first invalid data length). Since the first invalid data starting logical address is "LBA(0)", and the first invalid data length is "2", the first logical address section would include two logical addresses LBA(0) and LBA(1). Next, the processor 211 identifies that, according to the logical-to-physical table 504 (see FIG. 5D) in the memory, the physical addresses which are corresponding to the logical addresses LBA(0) and LBA(1) (corresponding to the first logical address section) are respectively "51_6" and "51_7" and corresponding valid data D516 and D517 (also referred to as first valid data). Since the valid data D516 and D517 have not been selected, the processor 211 selects the valid data D516 (also referred to as second valid data) first.

Thereafter, in step S353, the processor 211 compares a first trim information timestamp recorded in the second trim information with a valid data timestamp of the second valid data. The valid data timestamp is the timestamp of the physical unit that stores the second valid data. Further to the example provided above, the processor 211 compares the trim information timestamp "X1" of the trim information TI1 with the valid data timestamp (i.e., the timestamp "X1" of the physical unit 51 that stores the valid data D516) of the valid data D516.

In the embodiment, if the first trim information timestamp is larger than the valid data timestamp of the second valid data, then step S354 is performed. If the first trim information timestamp is smaller than the valid data timestamp of the second valid data, then step S355 is performed. If the first trim information timestamp is equal to the valid data timestamp of the second valid data, then step S356 is performed.

In the example provided above, since the trim information timestamp "X1" of the trim information TI1 is equal to the valid data timestamp "X1" of the valid data D516, the step S356 is performed. The processor 211 determines whether the first trim information page order recorded in the second trim information is larger than or smaller than the valid data page order of the second valid data. The valid data page order is the order of the physical page, which is for storing the second valid data, among all of the physical pages of the physical unit. In the embodiment, if it is determined that the first trim information page order is larger than the valid data page order of the second valid data, the processor 211 performs step S354. If the first trim information page order is smaller than the valid data page order, then step S355 is performed.

For example, continue the example provided above, the processor 211 further determines whether the trim information page order "5" of the trim information TI1 is larger than or smaller than the valid data page order of the valid data D516. Since the valid data D516 is stored in the physical page 51(6), the order thereof is the sixth order of all the physical pages in the physical unit 51. Therefore, the valid data page order of the valid data D516 is "6". Based on the above, the processor 211 determines that the trim information page order ("5") of the trim information TI1 is smaller than the valid data page order (i.e., 5 is smaller than 6) of the valid data D516, and performs step S355 afterwards.

In step S355, the processor 211 modifies the second trim information according to the first logical address to make the first logical address section not include the first logical address (e.g., the processor 211 deletes the first logical address from the first logical address section). Specifically, since the trim information page order of the trim information TI1 is smaller than the valid data page order of the valid data D516, the processor 211 determines that the time at which the valid data D516 is written is later than the time at which the trim information TI1 is written, and the processor 211 makes the determination based on the valid data D516 and the corresponding logical address LBA(0). The processor 211 would not determine that data stored in the logical address LBA(0) is invalid data on the basis of that the logical address LBA(0) corresponding to the valid data D516 is included in the logical address section that stores the invalid data indicated by the trim information TI1 (because data D516 has larger timestamp than the corresponding trim information and data D516 would be a real valid data). In other words, the processor 211 does not change (clear) the data "51_6" recorded in the physical address PBA(0) corresponding to the logical address LBA(0) of the logical-to-physical table 504. In addition, the processor 211 may update the logical address section of the trim information TI1 of the trim information list TIL1 so that this logical address section would not include the logical address LBA (0). For example, the processor 211 may modify the invalid data starting logical address of the trim information TI1 into the logical address LBA(1), and modify the invalid data length of the trim information TI1 into the logical address LBA(1), so as to update the trim information TI1. At this point, the parsing operation of the valid data D516 is completed.

Next, in step S357, the processor 211 determines whether all of the plurality of first valid data in the first logical address section are selected; if yes, then step S358 is performed; if not, then step S352 is performed so as to select the rest of valid data that have not been selected in the logical address section to be parsed.

In continuation of the above example, after the valid data D516 is parsed, in step S357, the processor 211 determines that the valid data D516 and D517 are not both selected (i.e., the valid data D517 has not been selected); the processor 211 performs the step S352 again and performs parsing operation on the valid data D517. Similar to the parsing operation performed on the valid data D516, the processor 211 make determination based on the logical address LBA(1) corresponding to the valid data D517, and does not modify (clear) the data "51_7" recorded in the physical address PBA(0) corresponding to the logical address LBA(1) of the logical-to-physical table 504. In addition, the processor 211 may modify the logical address section of the trim information TI1 of the trim information list TIL1 such that the logical address section does not include the logical address LBA(0). For example, the processor 211 can delete/clear all of the information of the trim information TI1 (since the processor 211 determines the data in the logical address section indicated by the trim information TI1 is all valid data).

Subsequently, in step S357, the processor 211 determines that both of the valid data D516 and D517 are selected (parsed), and determines that the parsing operation performed to the trim information TI1 is completed. Thereafter, step S358 is performed; the processor 211 determines whether the plurality of first trim information is all parsed. That is, when the parsing operation of one trim information is completed, the processor 211 determines if there is any trim information that has not been parsed in the trim information list currently in the memory.

For example, further to the example provided above, since the trim information TI2 has not be parsed and is arranged in the first order of the trim information that has not been parsed, referring to FIG. 5F, at a time T6, the processor 211 begins to perform parsing operation (as indicated by arrow A509) on the trim information TI2. As the method described above, the processor 211 identifies the valid data D514 in the logical address section indicated by the trim information TI2 and the corresponding logical address LBA(3), and determines that the trim information page order of the trim information TI2 is larger than valid data page order of the valid data D514. Based on the above, the processor 211 can know that, regarding whether or not the data stored in the logical address LBA(3) is invalid data, the corresponding information (trim information TI2 indicates that the data is invalid data) provided by the trim information TI2 is more accurate than the corresponding information (logical-to-physical table indicates that the data is valid data) provided by the logical-to-physical table. Afterwards, the processor 211 performs step S354. In step S354, the processor 211 determines that the second valid data is invalid, and clears the first physical address, corresponding to the first logical address, recorded in the second logical-to-physical table. That is, the processor 211 determines that the valid data D514 is invalid (i.e., the data D514 stored in the physical page 51(4) is invalid data), and clears (i.e., "51_4" is modified to "0") the data recorded in the physical address PBA(3) corresponding to the logical address LBA(3) of the logical-to-physical table, so as to update the logical-to-physical table 504 as the logical-to-physical table 507.

Similarly, the processor 211 performs step S357. The processor 211 determines that all of the valid data in the logical address section corresponding to the trim information TI2 are parsed; then step S358 is performed, and determines that all of the trim information in the trim information list TIL1 are parsed. At this point, the processor 211 completes the operation of updating the logical-to-physical table 504 and updating the trim information list TIL1. At this time, the information recorded in the updated logical-to-physical table 507 is the same as the information recorded in the logical-to-physical table 503 before the power-off event (e.g., time T2). The processor 211 thus completes the data recovery operation corresponding to the power-off event.

Second Embodiment

The second embodiment is described in continuation of the first embodiment. The hard disk device and data backup method and data recovery method are the same as described in the first embodiment; therefore, no repetition is incorporated herein. The following descriptions are related to implementation of data backup method and data recovery method including a garbage collecting operation with reference to a second embodiment as well as FIG. 5G to FIG. 5L, so as to further illustrate the effect of the invention.

Figure 5G:
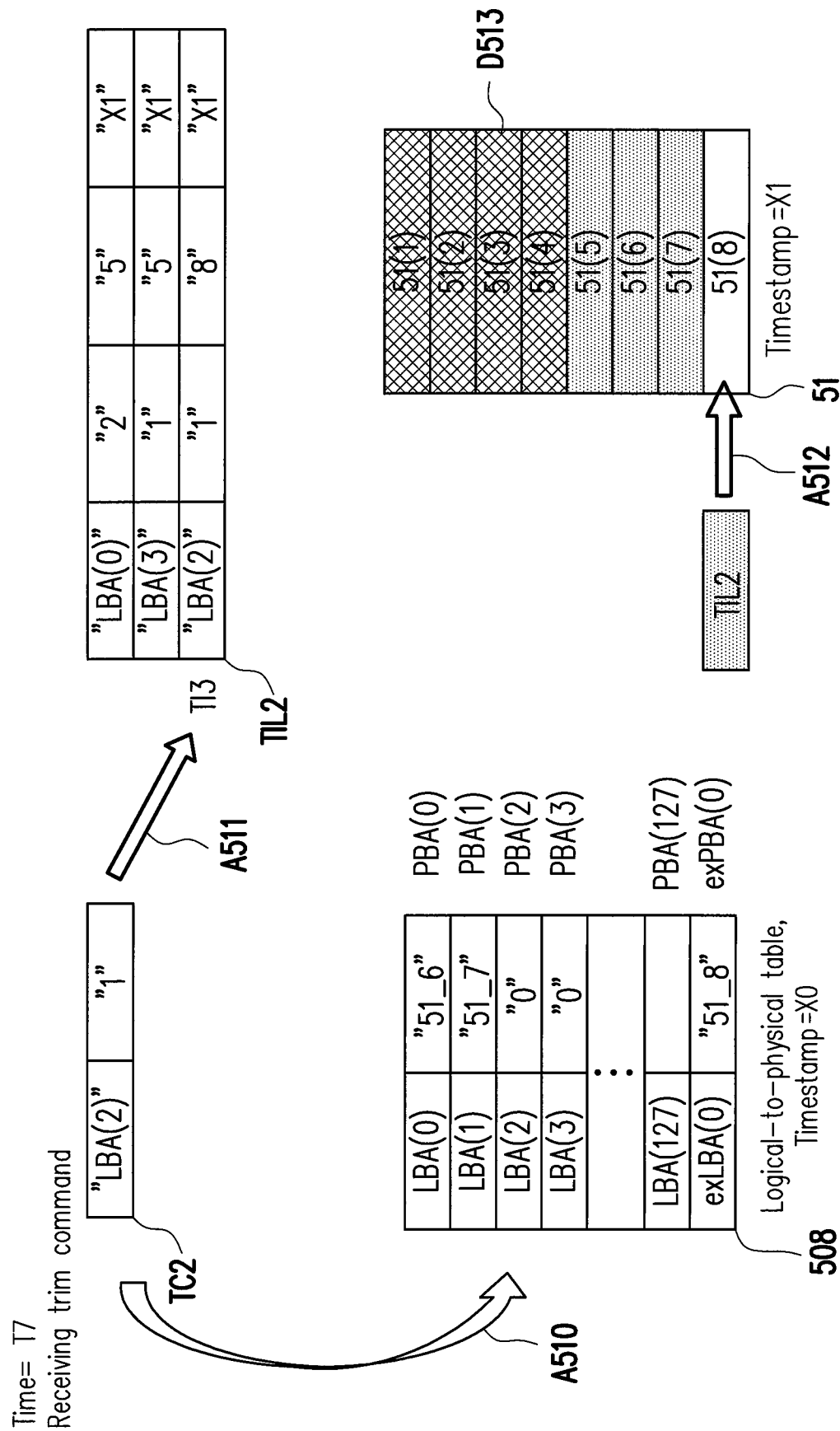
FIG. 5G to FIG. 5H are schematic diagrams of a data backup method according to a second embodiment of the invention.
Figure 5H:
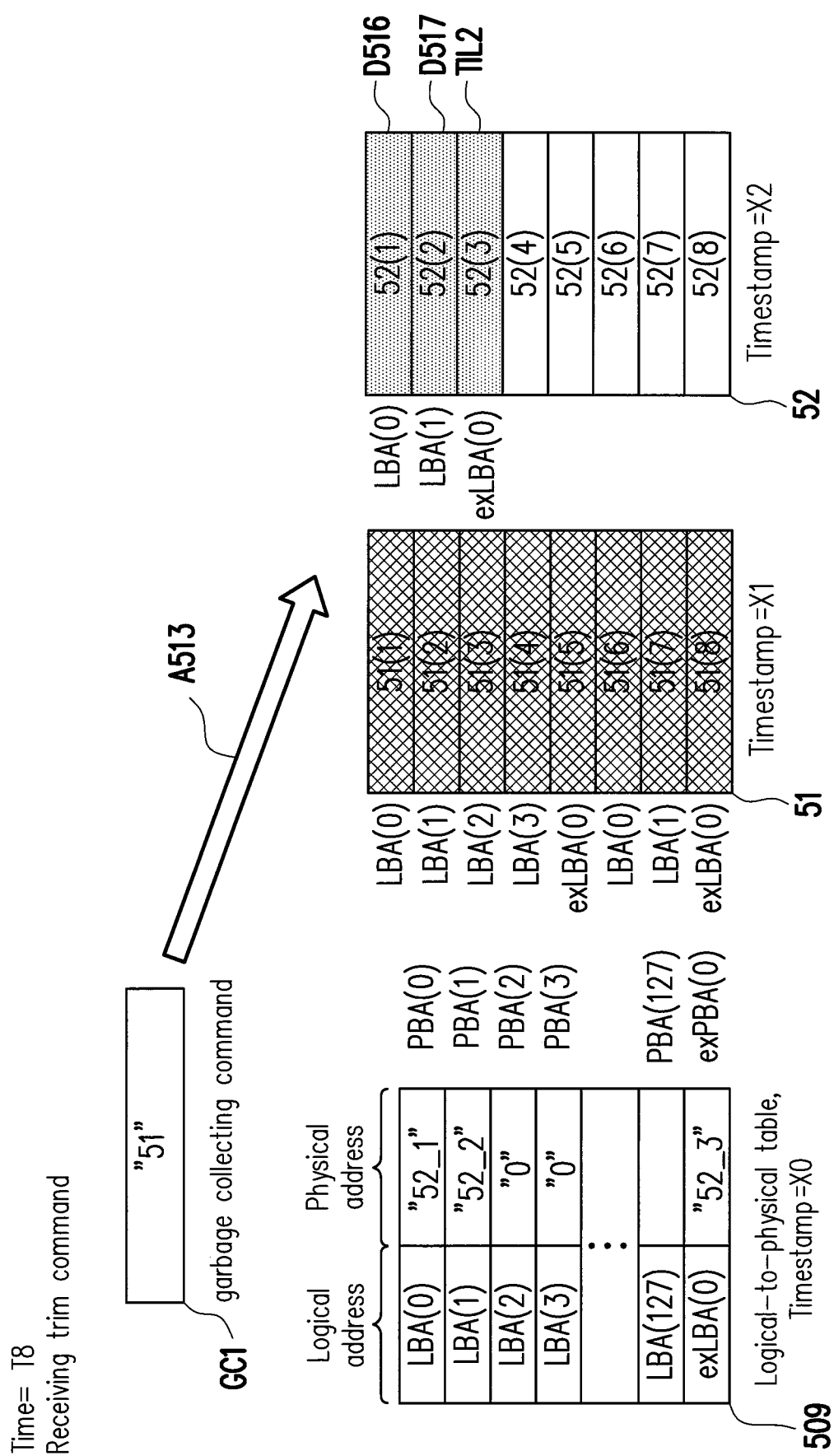

FIG. 5G to FIG. 5H are schematic diagrams of a data backup method according to a second embodiment of the invention. FIG. 5I to FIG. 5L are schematic views of data recovery method according to the second embodiment of the invention. Referring to FIG. 5G, further to the example of FIG. 5C, at a time T7 after time T2, the processor 211 receives the trim command TC2. The processor 211 updates the logical-to-physical table 503 as the logical-to-physical table 508 (as indicated by arrow A510) according to a trim command TC2, that is, modifying the information "51_3" recorded in the physical address PBA(2) corresponding to the logical address LBA(2) of the logical-to-physical table 503 into "0" according to the logical address LBA(2) indicated by the trim command TC2. In addition, the processor 211 updates the trim information list TIL1 in the memory as the trim information list TIL2 (as indicated by arrow A511), that is, adding a trim information TI3 corresponding to the trim command TC2 to the trim information list TIL1, so as to make the trim information list TIL1 as the trim information list TIL2. In the embodiment, the updated trim information list TIL2 is written into the physical page 51(8) (as indicated by arrow A512), and the information recorded in the physical address exPBA(0) corresponding to the extended logical address is the address "51_8" of the physical page 51(8). The generating method of the trim information TI3 is described above and thus no repetition is incorporated herein.

Referring to FIG. 5H, at a time T8 after time T7, the processor 211 receives a garbage collecting command GC1. The garage collecting command GC1 records the information (e.g., "51") of the physical unit to be performed a garbage collecting operation. According to the garbage collecting command GC1 and the logical-to-physical table 508, the processor 211 selects an available physical unit 52 and copies all of the valid data (i.e., data D516, D517, TIL2 stored in the physical unit and recorded by the logical-to-physical table 508) in the physical unit 51 to the physical unit 52 (as shown by arrow A513), and correspondingly updates the logical-to-physical table 508 as the logical-to-physical table 509. The timestamp of the physical unit 52 is "X2" (X2 is larger than X1, X1 is larger than X0). It should be pointed out that, initially there are two trim information lists TIL1 and TIL2 in the physical unit 51. The processor 211 may determine that the trim information list TIL2 is the latest (valid) trim information list according to the value "51_8" recorded in the physical address exPBA(0) written into the latest trim information list recorded in the logical-to-physical table 508, and copy the trim information list TIL2 during the garbage collecting operation for the physical unit 51, and correspondingly update the physical address (i.e., "52_3") of the trim information list TIL2 in the physical unit 52 in the logical-to-physical table 509. In other words, the processor 211 updates the logical-to-physical table 508 as the logical-to-physical table 509 according to the physical addresses "52_1", "52_2" and "52_3" of the physical pages 52(1), 52(2) and 52(3) for storing the valid data D516, D517, TIL2 as well as the logical addresses LBA(0), LBA(1) and the logical address exLBA(0) corresponding to the latest trim information list that has been stored.

Figure 5I:
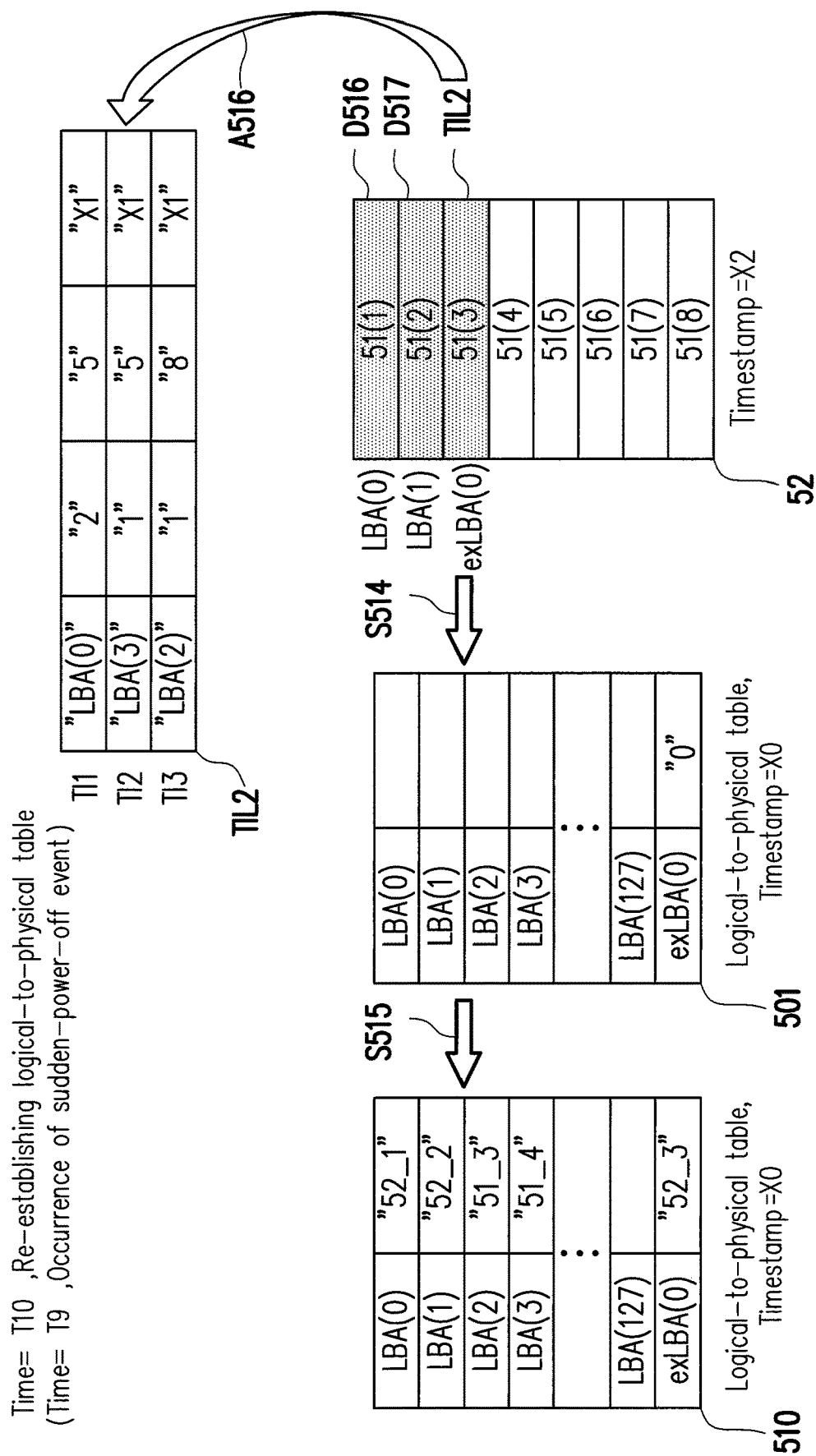
FIG. 5I to FIG. 5L are schematic diagrams of a data recovery method according to a second embodiment of the invention.

Referring to FIG. 5I, assuming that the sudden-power-off event occurs at a time T9 later than the time T8. It should be indicated that the physical unit 51 has not been erased yet. After the storage device 20 is turned on, the processor 211 detects the occurrence of the sudden-power-off event, and correspondingly performs data recovery operation. In the data recovery operation, similar to the data recovery method as described in the first embodiment, at a time T10 later than the time T9, the processor 211 re-establishes the logical-to-physical table first (as indicated by arrow A514 and A515) so as to acquire and stores the logical-to-physical table 510 in the memory. It should be mentioned that, according to the re-established logical-to-physical table 510, the processor 211 currently interprets that the logical address LBA(2) stores the valid data D513 in the physical address "51_3", and that the logical address LBA(3) stores the valid data D514 in the physical address "51_4". In addition, the processor 211 identifies the latest trim information list TIL2 in the physical unit 52, and stores the trim information list TIL2 in the memory (as indicated by arrow A516). It should be pointed out that if the timestamps of the physical unit to which the plurality of trim information lists belong are equal to each other, the processor 211 may determine whether the plurality of trim information lists are old or new according to the page orders (the one with latter page order is newer) or the number of the trim information included therein (the one with more number of the trim information is newer).

Figure 5J:
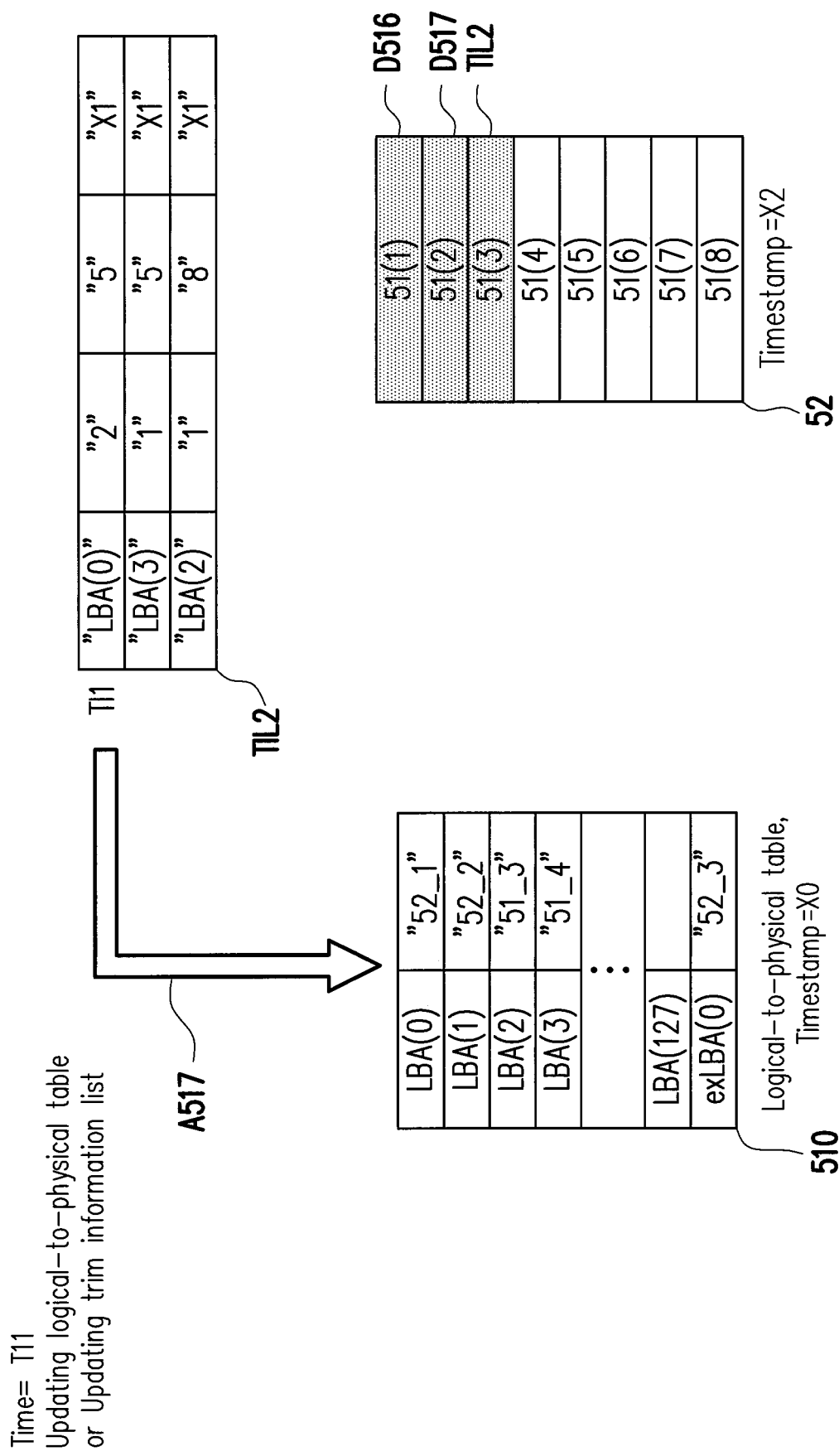

Referring to FIG. 5J, the processor 211 starts to parse the trim information TI1 of the trim information list TIL2. Based on the above-mentioned data recovery method, (since the trim information timestamp "X1" of the trim information TI1 is smaller than the valid data timestamp "X2" of the valid data D516 and D517), the processor 211 determines that the logical address section (logical addresses LBA(0) to LBA(1)) indicated by the trim information TI1 stores valid data, and does not modify the information (as indicated by arrow A517) recorded in the physical address corresponding to the logical addresses LBA(0) and LBA(1) of the logical-to-physical table 510.

Figure 5K:
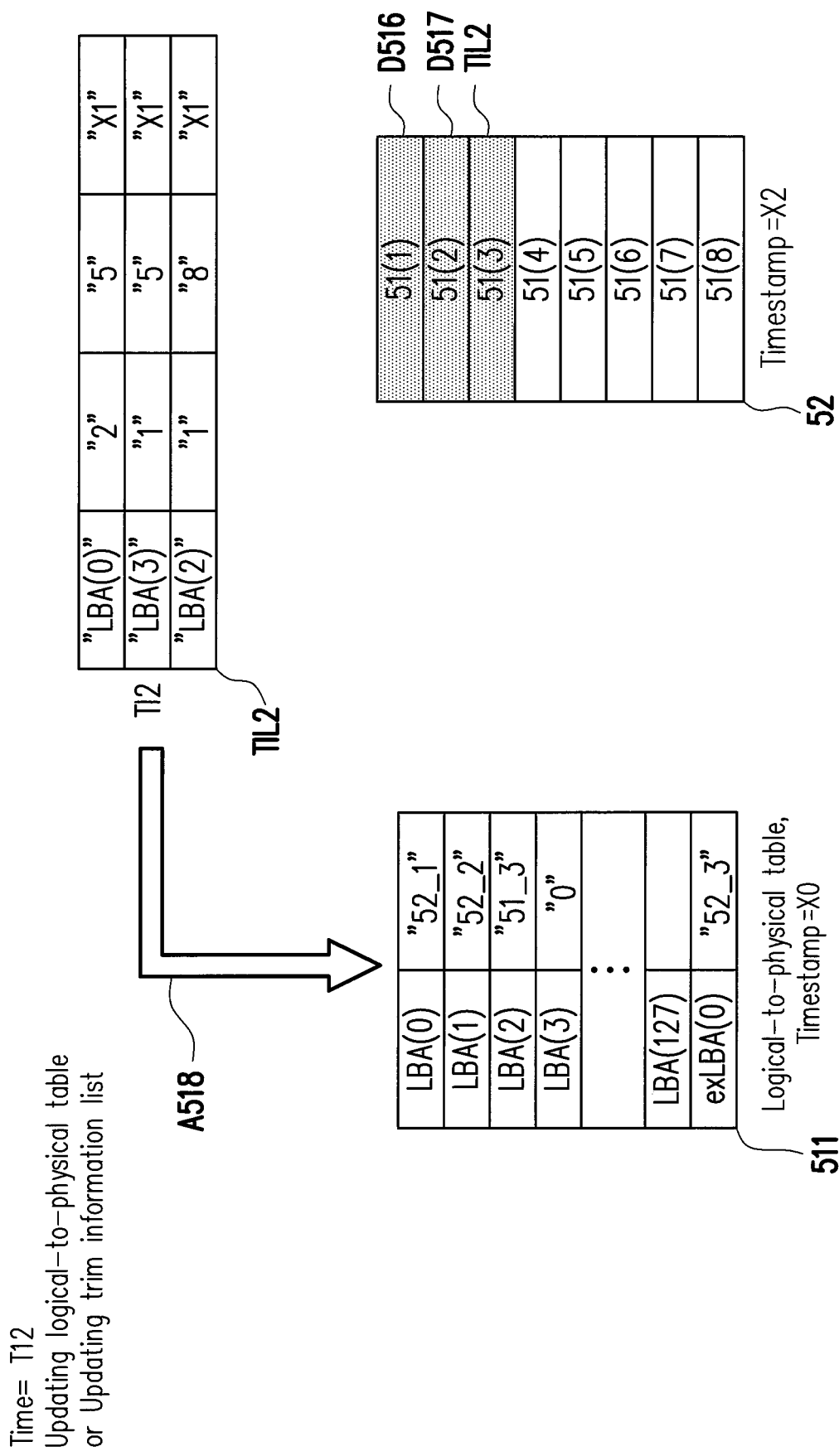

Referring to FIG. 5K, after the trim information TI1 is parsed, the processor 211 begins to parse the trim information TI2 of the trim information list TIL2. The trim information TI2 indicates that the logical address LBA(3) (corresponding to physical address "51_4" according to the logical-to-physical table 510) stores invalid data. Based on the above-mentioned data recovery method, since the trim information timestamp "X1" of the trim information TI2 is equal to (corresponding to the physical address "51_4") the valid data timestamp "X1" of the data D514 and the trim information page order "5" of the trim information TI2 is larger than the valid data page order "4" (the trim information page order "5" of the trim information TI2 is larger than the page order "4" of the physical page corresponding to the physical address "51_4" recorded in the logical-to-physical table) of the valid data D514, the processor 211 determines that the logical address section (logical address LBA(3)) indicated by the trim information TI2 stores invalid data, and modifies the information (as shown by arrow A518, the information recorded in the physical address corresponding to the logical address LBA(3) of the logical-to-physical table 511 is modified from "51_4" to "0") recorded in the physical address corresponding to the logical address LBA(3) of the logical-to-physical table 510, so as to acquire the updated logical-to-physical table 511.

Figure 5L:
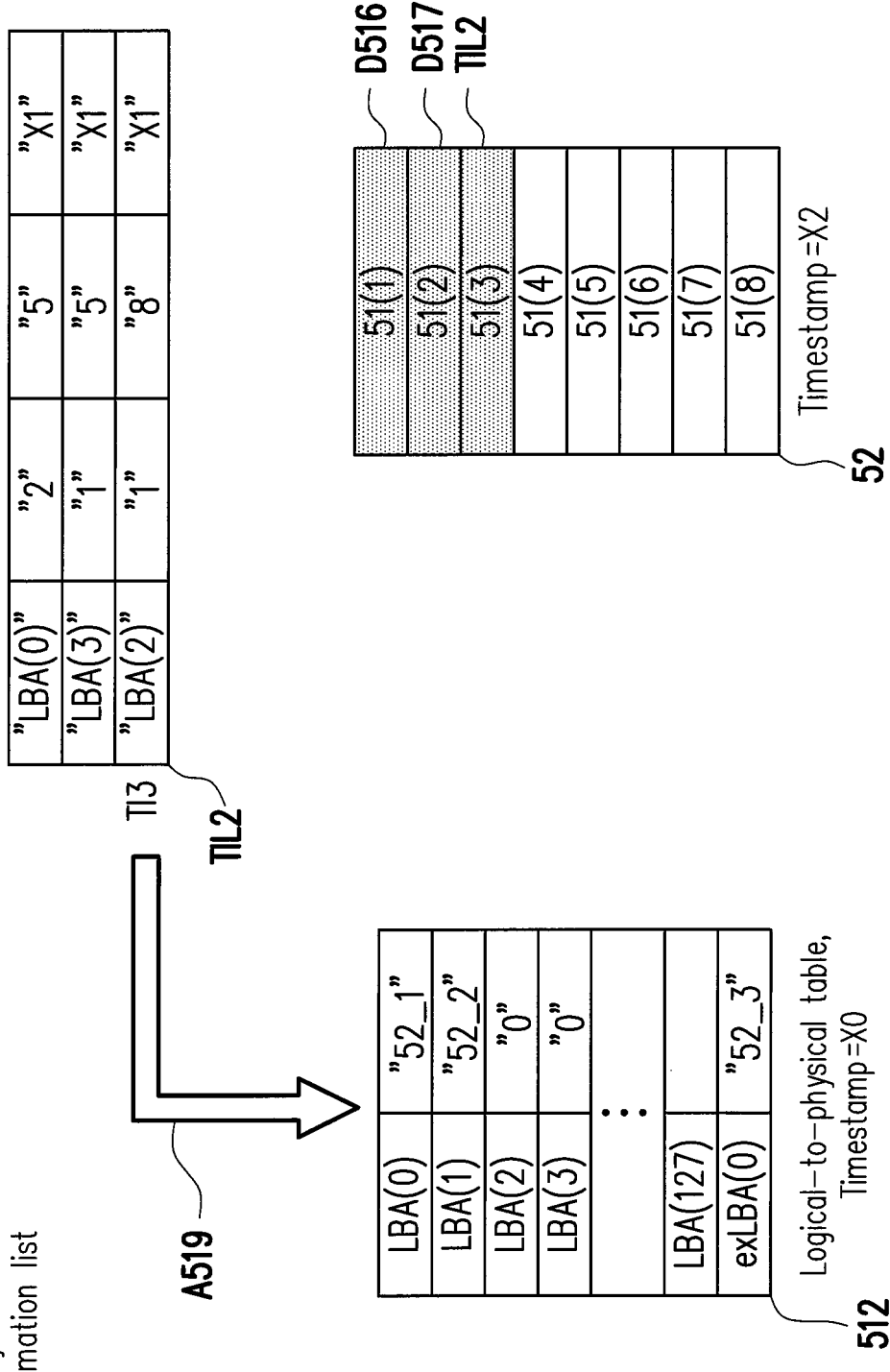

Referring to FIG. 5L, after the trim information TI2 is parsed, the processor 211 begins to parse the trim information TI3 of the trim information list TIL2. The trim information TI3 indicates that the logical address LBA(2) (corresponding to physical address "51_3" according to the logical-to-physical table 510) stores invalid data. Since the trim information timestamp "X1" of the trim information TI3 is equal to (corresponding to the physical address "51_3") the valid data timestamp "X1" of the data D513, and the trim information page order "8" of the trim information TI3 is larger than the valid data page order "3" (the trim information page order "8" of the trim information TI2 is larger than the page order "3" of the physical page corresponding to the physical address "51_3" recorded by the logical-to-physical table) of the data D513, the processor 211 determines that the logical address section (logical address LBA(2)) indicated by the trim information TI3 stores invalid data, and modifies the information (as shown by arrow A519, the information recorded in the physical address corresponding to the logical address LBA(2) of the logical-to-physical table 512 is modified from "51_3" to "0") recorded in the physical address corresponding to the logical address LBA(2) of the logical-to-physical table 511, so as to acquire the updated logical-to-physical table 512. At this time, all of the trim information of the trim information list TIL2 is parsed, and data recovery operation is completed. It should be indicated that, after the data recovery operation is completed, the mapping relationship between the logical address and physical address recorded by the logical-to-physical table 512 can be restored to be the same as the mapping relationship recorded in the logical-to-physical table 509 before the occurrence of sudden-power-off event (time T8).

In summary, the data backup method, data recovery method and storage controller provided by the embodiments of the invention can generate trim information (list) having specific data structure according to the received trim command, and utilize the trim information list and the logical-to-physical table backed up to the rewritable non-volatile memory module to perform corresponding data recovery operation. Since it is not required to back up corresponding trim information and logical-to-physical table to the rewritable non-volatile memory module due to the received trim command, a large amount of writing operation can be avoided, thereby improving the overall operation efficiency of the storage device. In addition, after occurrence of (sudden) power-off event, the accuracy of the above data can be identified via the backed up trim information list having specific structure (recorded timestamp and page order) as well as the logical-to-physical table and corresponding timestamp or/and page order so that the data recovery operation can be performed effectively, and the trim information list and logical-to-physical table before occurrence of power-off event can be re-established.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A data backup method, adapted to a storage device equipped with a rewritable non-volatile memory module, wherein the rewritable non-volatile memory module comprises a plurality of physical units, and the rewritable non-volatile memory module is allocated with a plurality of physical addresses, wherein a host system coupled to the storage device is allocated with a plurality of logical addresses, the method comprising:

receiving a trim command from the host system, wherein the trim command indicates an invalid data stored in a logical address section;

generating a trim information according to the trim command and a target physical address among the physical addresses to update a first trim information list as a second trim information list according to the trim information by adding the generated trim information behind other trim information in the first trim information list maintained in a memory, wherein the target physical address is an address of a target physical page of a target physical unit, and the target physical page is used for storing the second trim information list, wherein the trim information records an invalid data starting logical address, an invalid data length, a trim information page order and a trim information timestamp;

storing the second trim information list to the target physical address, wherein the first or the second trim information list records one or more trim information in order according to a time sequence of receiving a trim command corresponding to the one or more trim information, wherein the trim information page order is an order of the target physical page in all of the physical pages of the target physical unit, wherein the trim information timestamp is a timestamp of the target physical unit;

recording the target physical address for storing the second trim information list to a trim information list physical address of a first logical-to-physical table, so as to update the first logical-to-physical table as a second logical-to-physical table; and when a predetermined condition is fulfilled, storing the second logical-to-physical table to the rewritable non-volatile memory module.

2. The data backup method according to claim 1, further comprising:

identifying an available physical unit among the physical units as the target physical unit, and identifying an available physical page among a plurality of physical pages of the target physical unit as the target physical page; and identifying the timestamp of the target physical unit, and identifying the order of the target physical page in all of the physical pages of the target physical unit as a page order corresponding to the target physical page, wherein the timestamp of the target physical unit represents the earliest time at which the target physical unit is used.

3. The data backup method according to claim 2, wherein the trim command comprises an starting logical address of the logical address section and a section length of the logical address section, wherein the starting logical address represents a first logical address of the logical address section, and the section length represses a total number of all of logical addresses included in the logical address section, wherein the step of generating the trim information according to the trim command, the target physical address in the physical addresses to update the first trim information list as the second trim information list according to the trim information comprises:

according to the received trim command, recording the starting logical address of the logical address section as an invalid data starting logical address of the trim information, and recording the section length of the logical address section as an invalid data length of the trim information; and according to the target physical address, recording the page order corresponding to the target physical page as the trim information page order of the trim information, and recording the timestamp of the target physical unit as the trim information timestamp of the trim information, so as to generate the trim information.

4. The data backup method according to claim 3, wherein the step of storing the second logical-to-physical table to the rewritable non-volatile memory module when the predetermined condition is fulfilled comprises:

when the predetermined condition is fulfilled, updating the second logical-to-physical table according to all of trim information in the second trim information list, clearing the trim information list physical address of the second logical-to-physical table, and storing the second logical-to-physical to the rewritable non-volatile memory module; and in responding to storing the updated second logical-to-physical table to the rewritable non-volatile memory module, clearing all of the trim information recorded in the second trim information list maintained in the memory.

5. A data recovery method, adapted to a storage device equipped with a rewritable non-volatile memory module, wherein the rewritable non-volatile memory module has a plurality of physical units, and the rewritable non-volatile memory module is allocated with a plurality of physical addresses, wherein a host system coupled to the storage device is allocated with a plurality of logical address, the method comprising:

re-establishing a first logical-to-physical table according to the first logical-to-physical table stored in the rewritable non-volatile memory module, a physical address of all valid data of which a timestamp is larger than a timestamp of the first logical-to-physical table in the rewritable non-volatile memory module, and a corresponding logical address, and storing the re-established first logical-to-physical table to a memory as a second logical-to-physical table;

if the rewritable non-volatile memory module stores one or more first trim information lists, identifying a latest second trim information list among the one or more trim information lists, wherein the second trim information list records one or more trim information, and the second trim information list is stored in a target physical page of a target physical unit, wherein each of the trim information records an invalid data starting logical address, an invalid data length, a trim information page order and a trim information timestamp, wherein the trim information page order is an order of the target physical page in all of the physical pages of the target physical unit, wherein the trim information timestamp is a timestamp of the target physical unit, wherein a timestamp of the one or more first trim information lists is larger than a timestamp of the first logical-to-physical table; and updating the second logical-to-physical table or updating a third trim information list stored in the memory according to all of the trim information in the second trim information list and the second logical-to-physical table.

6. The data recovery method according to claim 5, further comprising:

in responding to completion of updating the third trim information list, storing the updated third trim information list to a target physical address of the rewritable non-volatile memory module; and recording the target physical address to a trim information list physical address of the second logical-to-physical address.

7. The data rectory method according to claim 5, wherein the step of updating the second logical-to-physical table or updating the third trim information list stored in the memory according to all of the trim information in the second trim information list and the second logical-to-physical table comprises:

selecting a second trim information among the first trim information according to a recording sequence of a plurality of first trim information recorded in the second trim information list, so as to perform a parsing operation on the selected second trim information, and updating the second logical-to-physical table or updating the third trim information list according to a result of the parsing operation, wherein the second trim information is the most front one, in the recording sequence, of the trim information that has not been parsed among the plurality of first trim information.

8. The data recovery method according to claim 7, wherein the step of performing the parsing operation on the selected second trim information and updating the second logical-to-physical table or updating the third trim information list according to the result of the parsing operation comprises:

(1) identifying a first logical address section according to a first invalid data starting logical address and a first invalid data length recorded in the selected second trim information, identifying a plurality of first valid data stored in a plurality of first logical addresses in the first logical address section according to the second logical-to-physical table, and selecting a second valid data that has not been selected among the plurality of first valid data to perform step (2), wherein the second trim information instructs that a data stored in the first logical address section is invalid;

(2) comparing a first trim information timestamp recorded in the second trim information with a valid data timestamp of the second valid data, wherein if the first trim information timestamp is larger than a valid data timestamp of the second valid data, step (4) is performed, wherein the valid data timestamp is a timestamp of a first physical unit that stores the second valid data, wherein if the first trim information timestamp recorded in the second trim information is smaller than the valid data timestamp of the second valid data, step (5) is performed, wherein if the first trim information timestamp is equal to the valid data timestamp, step (3) is performed;

(3) determining whether a first trim information page order recorded in the second trim information is larger than or smaller than a valid data page order of the second valid data, wherein if the first trim information page order is larger than the valid data page order of the second valid data, step (4) is performed, wherein the valid data page order is an order of a first physical page, which is for storing the second valid data, among all of the physical pages of the first physical unit, wherein if the first trim information page order is smaller than the valid data page order, step (5) is performed;

(4) determining that the second valid data is invalid, clearing a first physical address, which is corresponding to the first logical address, recorded in the second logical-to-physical table, and performing step (6);

(5) modifying the second trim information according to the first logical address to make the first logical address section not include the first logical address, and performing step (6); and (6) determining whether all of the first valid data in the first logical address section are selected to perform step (2), wherein if all of the first valid data are selected, completing the parsing operation on the selected second trim information, wherein if not all of the first valid data are selected, step (1) is performed.

9. The data recovery method according to claim 7, wherein the step of updating the second logical-to-physical table or updating the third trim information list stored in the memory according to all of the trim information in the second trim information list and the second logical-to-physical table further comprises:

if all of the first trim information recorded in the second trim information list are parsed, determining that updating of the second logical-to-physical table and the third trim information list is completed.

10. A storage controller, for controlling a storage device equipped with a rewritable non-volatile memory module, and comprising:

a connection interface circuit, coupled to a host system allocated with a plurality of logical addresses;

a memory interface controlling circuit, coupled to the rewritable non-volatile memory module, wherein the rewritable non-volatile memory module comprises a plurality of physical units, and the rewritable non-volatile memory module is allocated with a plurality of physical addresses; and a processor, coupled to the connection interface circuit and the memory interface control circuit, wherein the processor receives a trim command from the host system, wherein the trim command indicates an invalid data stored in a logical address section, wherein the processor generates a trim information according to the trim command and a target physical address among the physical addresses, so as to update a first trim information list as a second trim information list according to the trim information by adding the generated trim information behind other trim information in the first trim information list maintained in a memory, wherein the target physical address is an address of a target physical page of a target physical unit, and the target physical page is used for storing the second trim information list, wherein the trim information records an invalid data starting logical address, an invalid data length, a trim information page order and a trim information timestamp, wherein the processor further stores the second trim information list to the target physical address, wherein the first or the second trim information list records one or more trim information in order according to a time sequence of receiving a trim command corresponding to the one or more trim information, wherein the trim information page order is an order of the target physical page in all of the physical pages of the target physical unit, wherein the trim information timestamp is a timestamp of the target physical unit, wherein the processor further records the target physical address for storing the second trim information list to a trim information list physical address recorded of a first logical-to-physical table, so as to update the first logical-to-physical table as a second logical-to-physical table, wherein when a predetermined condition is fulfilled, the processor further stores the second logical-to-physical table to the rewritable non-volatile memory module.

11. The storage controller according to claim 10, wherein the processor identifies an available physical unit among the physical units as the target physical unit, and identifies an available physical page among a plurality of physical pages of the target physical unit as the target physical page, wherein the processor identifies the timestamp of the target physical unit, and identifies the order of the target physical page in all of the physical pages of the target physical unit as a page order corresponding to the target physical page, wherein the timestamp of the target physical unit represents the earliest time at which the target physical unit is used.

12. The storage controller according to claim 11, wherein the trim command comprises an starting logical address of the logical address section and a section length of the logical address section, wherein the starting logical address represents a first logical address of the logical address section, and the section length represents a total number of all of the logical addresses included in the logical address section, wherein in the operation where the processor further generates the trim information according to the trim command and the target physical address among the physical addresses so as to update the first trim information list as the second trim information list according to the trim information, according to the received trim command, the processor records the starting logical address of the logical address section as an invalid data starting logical address of the trim information, and records the section length of the logical address section as an invalid data length of the trim information, wherein according to the target physical address, the processor records the page order corresponding to the target physical page as the trim information page order of the trim information and records the timestamp of the target physical unit as the trim information timestamp of the trim information so as to generate the trim information.

13. The storage controller according to claim 12, wherein in the operation where the predetermined condition is fulfilled, the processor further stores the second logical-to-physical table to the rewritable non-volatile memory module, when the predetermined condition is fulfilled, the processor updates the second logical-to-physical table according to all of the trim information in the second trim information list, clears the trim information list physical address in the second logical-to-physical table, and stores the second logical-to-physical table to the rewritable non-volatile memory module, in responding to storing the updated second logical-to-physical table to the rewritable non-volatile memory module, the processor clears all of the trim information recorded in the second trim information list maintained in the memory.

14. A storage controller, for controlling a storage device equipped with a rewritable non-volatile memory module, and comprising:

a connection interface circuit, coupled to a host system allocated with a plurality of logical addresses;

a memory interface control circuit, coupled to the rewritable non-volatile memory module, wherein the rewritable non-volatile memory module has a plurality of physical units, and the rewritable non-volatile memory module is allocated with a plurality of physical addresses; and a processor, coupled to the connection interface circuit and the memory interface control circuit, wherein the processor re-establishes the first logical-to-physical table according to a first logical-to-physical table stored in the rewritable non-volatile memory module, a physical address of all valid data of which a timestamp of the rewritable non-volatile memory module is larger than a timestamp of the first logical-to-physical table in the rewritable non-volatile memory module, and corresponding logical address, and storing the re-established first logical-to-physical table to a memory as a second logical-to-physical table, wherein if the rewritable non-volatile memory module stores one or more first trim information lists, the processor further identifies a latest second trim information list among the one or more first trim information lists, wherein the second trim information list records one or more trim information, and the second trim information list is stored in a target physical page of a target physical unit, wherein each of the trim information records an invalid data starting logical address, an invalid data length, a trim information page order and a trim information timestamp, wherein the trim information page order is an order of the target physical page in all of the physical pages of the target physical unit, wherein the trim information timestamp is a timestamp of the target physical unit, wherein a timestamp of the one or more first trim information list is larger than the timestamp of the first logical-to-physical table, wherein the processor further updates the second logical-to-physical table or updates a third trim information list stored in the memory according to all of the trim information in the second trim information list and the second logical-to-physical table.

15. The storage controller according to claim 14, wherein, in responding to completion of updating the third trim information list, the processor stores the updated third trim information list to a target physical address of the rewritable non-volatile memory module, wherein the processor records the target physical address to a trim information list physical address of the second logical-to-physical table.

16. The storage controller according to claim 14, wherein in the operation where the processor further updates the second logical-to-physical table or updates the third trim information list stored in the memory according to all of the trim information in the second trim information list and the second logical-to-physical table, the processor selects a second trim information among the plurality of first trim information according a recording sequence of the plurality of first trim information recorded in the second trim information list, so as to perform a parsing operation on the selected second trim information, and updates the second logical-to-physical table or updates the third trim information list according to a result of the parsing operation, wherein the second trim information is the most front one, in the recording sequence, of the plurality of trim information that has not been parsed in the first trim information.

17. The storage controller according to claim 16, wherein the operation of performing parsing operation on the selected second trim information and updating the second logical-to-physical table or updating the third trim information list according to the result of the parsing operation comprises:

(1) identifying a first logical address section according to a first invalid data starting logical address recorded in the selected second trim information and a first invalid length, identifying a plurality of first valid data among the plurality of first logical addresses stored in the first logical address section according to the second logical-to-physical table, and selecting a second valid data that has not be selected among the plurality of first valid data so as to perform step (2), wherein the second trim information indicates that a data stored in the first logical address section is invalid;

(2) the processor compares a first trim information timestamp recorded in the second trim information with a valid data timestamp of the second valid data, wherein if the first trim information timestamp is larger than a valid data timestamp of the second valid data, step (4)

is performed, wherein the valid data timestamp is a timestamp of a first physical unit that stores the second valid data, wherein if the first trim data timestamp recoded in the second trim information is smaller than the valid data timestamp of the second valid data, then step (5) is performed, wherein if the first trim information timestamp is equal to the valid data timestamp, then step (3) is performed;

(3) the processor determines whether a first trim information page order recorded in the second trim information is larger than or smaller than a valid data page order of the second valid data, wherein if the first trim information page order is larger than the valid data page order of the second valid data, then step (4) is performed, wherein the valid data page order is a sequence of storing a first physical page of the second valid data in all of the physical pages of the first physical unit, wherein if the first trim information page order is smaller than the valid data page order, then step (5) is performed;

(4) the processor determines that the second valid data is invalid, and clears a first physical address corresponding to the first logical address recorded in the second logical-to-physical table, and steps (6) is performed;

(5) the processor modifies the second trim information according to the first logical address such that the first logical address section does not include the first logical address, and step (6) is carried; and (6) the processor determines whether all of the first valid data in the first logical address section is selected so as to perform step (2), wherein if all of the first valid data are all selected, completing the parsing operation on the selected second trim information, wherein if not all of the first valid data are selected, then step (1) is performed.

18. The storage controller according to claim 16, wherein in the operation where the processor further updates the second logical-to-physical table or updates the third trim information list stored in the memory according to all of the trim information in the second trim information list and the second logical-to-physical table, if all of the first trim information recorded in the second trim information list is parsed, the processor determines that updating of the second logical-to-physical table and the third trim information list is completed.

* * * * *